(12) United States Patent
Nogami et al.

(10) Patent No.: US 10,271,316 B2
(45) Date of Patent: Apr. 23, 2019

(54) USER EQUIPMENTS, BASE STATIONS AND METHODS

(71) Applicant: Sharp Laboratories of America, Inc., Camas, WA (US)

(72) Inventors: Toshizo Nogami, Vancouver, WA (US); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 30 days.

(21) Appl. No.: 15/460,042

(22) Filed: Mar. 15, 2017

(65) Prior Publication Data

US 2017/0273071 A1 Sep. 21, 2017

Related U.S. Application Data

(60) Provisional application No. 62/311,219, filed on Mar. 21, 2016.

(51) Int. Cl.
*H04W 72/04* (2009.01)
*H04W 72/12* (2009.01)
*H04W 74/08* (2009.01)

(52) U.S. Cl.
CPC ... *H04W 72/0413* (2013.01); *H04W 72/1242* (2013.01); *H04W 72/1268* (2013.01); *H04W 74/085* (2013.01)

(58) Field of Classification Search
CPC ......... H04W 72/0413; H04W 72/1242; H04W 72/1268; H04W 74/085
See application file for complete search history.

(56) References Cited

U.S. PATENT DOCUMENTS

| 9,762,357 | B2* | 9/2017 | Maattanen | H04L 1/1671 |
| 2015/0043488 | A1 | 2/2015 | Hakola et al. | |
| 2015/0245347 | A1* | 8/2015 | Yi | H04L 5/001 370/280 |
| 2017/0215179 | A1* | 7/2017 | Choi | H04W 72/0413 |
| 2018/0375619 | A1* | 12/2018 | Hwang | H04B 7/26 |

FOREIGN PATENT DOCUMENTS

EP 2547030 A2 1/2013

OTHER PUBLICATIONS

Huawei, HiSilicon, "Overview of short TTI," 3GPP TSG-RAN WG1 Meeting #84, St Julian's, Malta, R1-160291, Feb. 19, 2016.
(Continued)

*Primary Examiner* — Asad M Nawaz
*Assistant Examiner* — Thomas R Cairns
(74) *Attorney, Agent, or Firm* — Austin Rapp

(57) ABSTRACT

A user equipment (UE) is described that includes a higher-layer processor configured to configure a shortened transmission timing interval (TTI) for a serving cell. The UE also includes a physical uplink channel transmitter configured to transmit a physical uplink control channel (PUCCH) on the serving cell. The UE further includes a shortened physical uplink channel transmitter configured to transmit a shortened physical uplink control channel (SPUCCH) on the serving cell. In a case that a transmission instance of the SPUCCH collides with an uplink subframe where the PUCCH is to be transmitted, the PUCCH is dropped, and the SPUCCH is transmitted.

4 Claims, 22 Drawing Sheets

(56) References Cited

OTHER PUBLICATIONS

Samsung, "Study on latency reduction due to TTI shortening," 3GPP TSG-RAN WG1 Meeting #84, St Julian's, Malta, R1-160584, Feb. 19, 2016.
Nokia Networks, Alcatel-Lucent, Alcatel-Lucent Shanghai Bell, "On Shorter TTI for Latency Reduction," 3GPP TSG-RAN WG1 Meeting #84, St Julian's, Malta, R1-160785, Feb. 19, 2016.
Qualcomm Incorporated, "TTI Shortening and Reduced Processing Time for DL Transmissions," 3GPP TSG-RAN WG1 Meeting #84, St Julian's, Malta, R1-160905, Feb. 19, 2016.
Ericsson, "Overview of TTI shortening and reduced processing time for DL transmissions," 3GPP TSG-RAN WG1 Meeting #84, St Julian's, Malta, R1-160929, Feb. 19, 2016.
NTT DOCOMO, Inc., "DL aspects of TTI shortening," 3GPP TSG-RAN WG1 Meeting #84, St Julian's, Malta, R1-160964, Feb. 19, 2016.
3GPP TS 36.211. v13.0.0, Evolved Universal Terrestrial Radio Access (E-UTRA); Physical channels and modulation (Release 13), Dec. 2015.
3GPP TS 36.212. v13.0.0, Evolved Universal Terrestrial Radio Access (E-UTRA); Multiplexing and channel coding (Release 13), Dec. 2015.
3GPP TS 36.213. v13.0.0, Evolved Universal Terrestrial Radio Access (E-UTRA); Physical layer procedures (Release 13), Dec. 2015.
International Search Report and Written Opinion issued for PCT Application No. PCT/US2017/022841 dated Jun. 14, 2017.
Lenovo, "Considerations on TTI shortening for UL," 3GPP TSG RAN WG1 Meeting #84, St Julian's, Malta, R1-161018, Feb. 19, 2016.
LG Electronics, "Uplink multiple channel transmission under UE transmit power limitation," 3GPP TSG RAN WG1#56bis, Seoul, Korea, R1-091206, Mar. 27, 2009.

* cited by examiner

US 10,271,316 B2

USER EQUIPMENTS, BASE STATIONS AND METHODS

RELATED APPLICATIONS

This application is related to and claims priority from U.S. Provisional Patent Application No. 62/311,219, entitled "USER EQUIPMENTS, BASE STATIONS AND METHODS," filed on Mar. 21, 2016, which is hereby incorporated by reference herein, in its entirety.

TECHNICAL FIELD

The present disclosure relates generally to communication systems. More specifically, the present disclosure relates to user equipments (UEs), base stations and methods.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
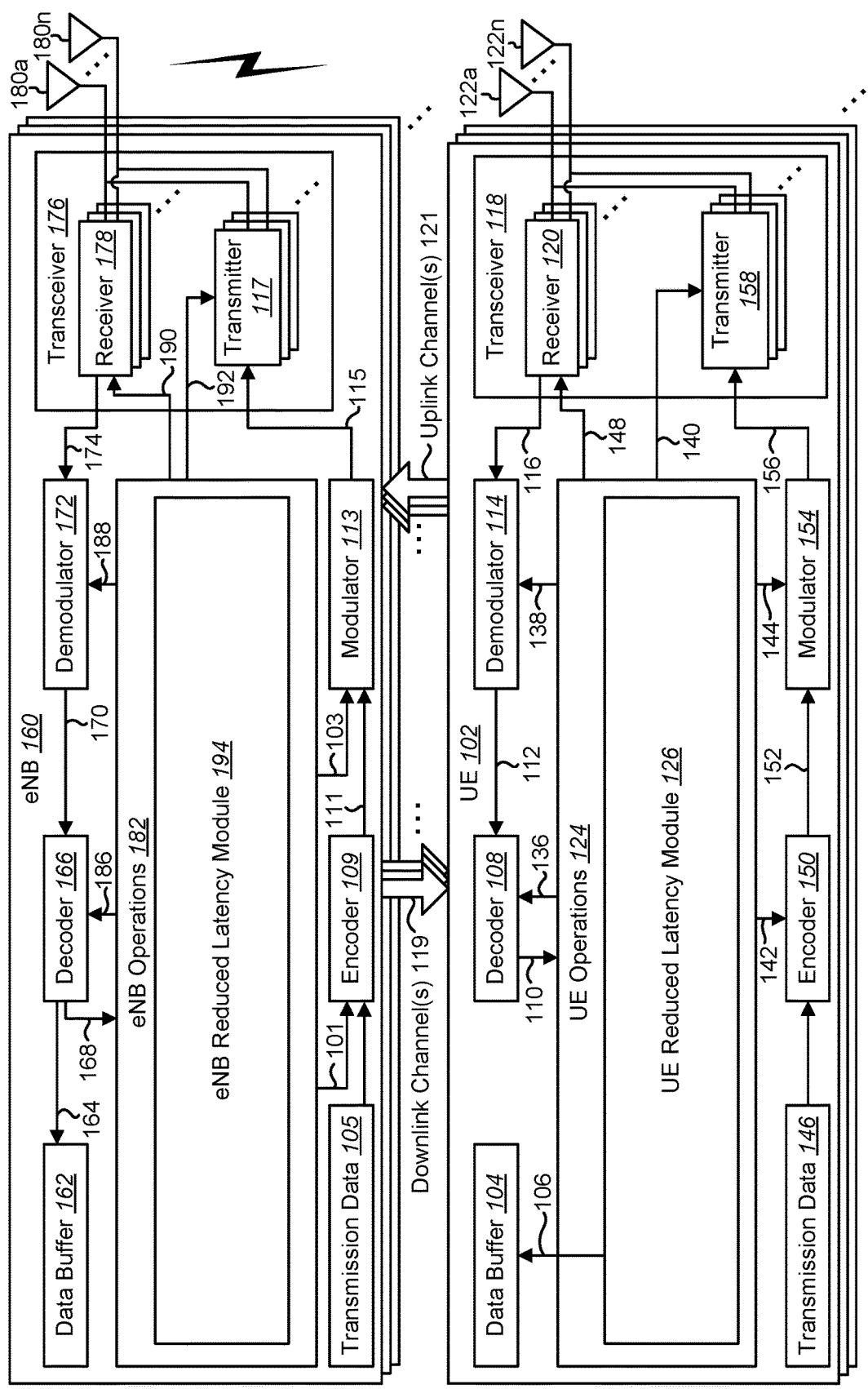
FIG. 1 is a block diagram illustrating one implementation of one or more evolved NodeBs (eNBs) and one or more user equipments (UEs) in which systems and methods for low latency radio communications may be implemented.

A user equipment (UE) is described that includes a higher-layer processor configured to configure a shortened transmission timing interval (TTI) for a serving cell. The UE also includes a physical uplink channel transmitter configured to transmit a physical uplink control channel (PUCCH) on the serving cell. The UE further includes a shortened physical uplink channel transmitter configured to transmit a shortened physical uplink control channel (SPUCCH) on the serving cell. In a case that a transmission instance of the SPUCCH collides with an uplink subframe where the PUCCH is to be transmitted, the PUCCH is dropped, and the SPUCCH is transmitted.

An evolved node B (eNB) is also described. The eNB includes a higher-layer processor configured to configure, in a UE, a shortened TTI for a serving cell. The eNB also includes a physical uplink channel receiver configured to receive a PUCCH on the serving cell. The eNB further includes a shortened physical uplink channel receiver configured to receive a SPUCCH on the serving cell. In a case that a transmission instance of the SPUCCH from the UE collides with an uplink subframe where the PUCCH is to be transmitted by the UE, the eNB assumes that the PUCCH is dropped and that the SPUCCH is transmitted.

A method for a UE is also described. The method includes configuring a shortened TTI for a serving cell. The method also includes transmitting a PUCCH on the serving cell. The method further includes transmitting a shortened SPUCCH on the serving cell. In a case that a transmission instance of the SPUCCH collides with an uplink subframe where the PUCCH is to be transmitted, the PUCCH is dropped, and the SPUCCH is transmitted.

A method for an eNB is also described. The method includes configuring, in a UE, a shortened TTI for a serving cell. The method also includes receiving a PUCCH on the serving cell. The method further includes receiving a shortened SPUCCH on the serving cell. In a case that a transmission instance of the SPUCCH from the UE collides with an uplink subframe where the PUCCH is to be transmitted by the UE, the eNB assumes that the PUCCH is dropped and that the SPUCCH is transmitted.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation (CA). Carrier aggregation refers to the concurrent utilization of more than one carrier. In carrier aggregation, more than one cell may be aggregated to a UE. In one example, carrier aggregation may be used to increase the effective bandwidth available to a UE. The same time division duplexing (TDD) uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Packet data latency is a performance metric of a communication system. There is a requirement to reduce the latency from the view point of the perceived responsiveness of the system for new features (e.g., real-time communication for robotics applications) as well as the more efficient transactions of the current HTTP/TCP-based packets. In addition, it is said that the Tactile Internet, which will have significant impacts on future business, market and human lives, needs extremely reduced latency signals. The Tactile Internet could be provided through the same band as the current cellular communication, a different band (e.g., a higher frequency band such as a millimeter wave) or both of them.

A promising candidate for realizing the latency reduction is shortened Transmission Time Interval (TTI) and/or shortened Round Trip Time (RTT). However, exact physical channel designs for the shortened TTI and/or shortened RTT have not been defined.

In 3GPP, a legacy subframe may contain multiple shortened TTIs with the same or different sizes. Also, the legacy TTI and shortened TTI can be multiplexed in the same subframe. Physical layer procedures for operation with shortened TTI are described herein for the number of hybrid automatic repeat request acknowledgment (HARQ-ACK) processes and soft buffer handling. Power control for sub-frame transmission with legacy TTI and shortened TTI multiplexing is also described. Collision handling of uplink control information (UCI) and channels between legacy and shortened TTI are also described.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for low latency radio communications may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more eNBs 160. The UE operations module 124 may include one or more of a UE reduced latency module 126.

Downlink and uplink transmissions may be organized into radio frames with a 10 millisecond (ms) duration. For a frame structure Type 1 (e.g., frequency division duplexing (FDD)), each 10 ms radio frame is divided into ten equally sized sub-frames. Each sub-frame consists of two equally sized slots. For a frame structure Type 2 (e.g., TDD), each 10 ms radio frame consists of two half-frames of 5 ms each. Each half-frame consists of eight slots of length 0.5 ms and three special fields: Downlink Pilot TimeSlot (DwPTS), guard period (GP) and Uplink Pilot TimeSlot (UpPTS). The length of DwPTS and UpPTS is configurable subject to the total length of DwPTS, GP and UpPTS being equal to 1 ms. Additional details about frame structure are discussed in connection with FIG. 5.

Both 5 ms and 10 ms switch-point periodicity are supported. Subframe 1 in all configurations and subframe 6 in a configuration with 5 ms switch-point periodicity consist of DwPTS, GP and UpPTS. Subframe 6 in a configuration with 10 ms switch-point periodicity consists of DwPTS only. All other subframes consist of two equally sized slots.

In LTE license access, subframes are classified into 2 types of subframes. One is the normal subframe that contains only either one of DL transmission and UL transmission. LTE license access with FDD has only the normal subframe. The other is the special subframe that contains three fields DwPTS, GP and UpPTS. DwPTS and UpPTS are durations reserved for DL transmission and UL transmission, respectively.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 Orthogonal Frequency Division Multiplexing (OFDM) symbols. UpPTS consists of 1 single carrier frequency-division multiple access (SC-FDMA) symbol.

2) Special subframe configuration 1: DwPTS consists of 9 OFDM symbols for normal cyclic prefix (CP) and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

In the downlink, the OFDM access scheme may be employed. In the downlink, PDCCH, enhanced physical downlink control channel (EPDCCH), PDSCH and the like may be transmitted. A downlink radio frame may consist of multiple pairs of downlink resource blocks (RBs). The downlink RB pair is a unit for assigning downlink radio resources, defined by a predetermined bandwidth (RB bandwidth) and a time slot. Two slots (i.e., slot0 and slot1) equal one subframe. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs. An example of a resource grid is discussed in connection with FIG. 6.

In Carrier Aggregation (CA), two or more CCs may be aggregated to support wider transmission bandwidths (e.g., up to 100 MHz, beyond 100 MHz). A UE 102 may simultaneously receive or transmit on one or multiple CCs. Serving cells can be classified into a primary cell (PCell) and a secondary cell (SCell).

The primary cell may be the cell, operating on the primary frequency, in which the UE 102 either performs the initial connection establishment procedure or initiates the connection re-establishment procedure, or the cell indicated as the primary cell in the handover procedure. The secondary cell may be a cell, operating on a secondary frequency, which may be configured once a Radio Resource Control (RRC) connection is established and which may be used to provide additional radio resources.

In the downlink, the carrier corresponding to the PCell is the downlink primary component carrier (DL PCC) while in the uplink it is the uplink primary component carrier (UL PCC). Similarly, in the downlink, the carrier corresponding to the SCell is the downlink secondary component carrier (DL SCC) while in the uplink it is the uplink secondary component carrier (UL SCC). The UE 102 may apply a system information acquisition (i.e., acquisition of broadcast system information) and change monitoring procedures for the PCell. For an SCell, E-UTRAN may provide, via dedicated signaling, all system information relevant for operation in an RRC CONNECTED message when adding the SCell.

In Dual Connectivity (DC), each of two or more serving cells may belong to either one of a master cell group (MCG) or a secondary cell group (SCG). The MCG is associated with a master eNB (MeNB) while the SCG is associated with a secondary eNB (SeNB).

DC operation may be configured to utilize radio resources provided by two distinct schedulers, located in the MeNB and SeNB. In the case of DC, the UE 102 may be configured with two Medium Access Control (MAC) entities: one MAC entity for MeNB and one MAC entity for SeNB.

When a UE 102 is configured with CA in the MCG, CA principles may generally apply to the MCG. For the SCG, at least one cell in the SCG has a configured UL CC and one of them, named the primary secondary cell (PSCell), is configured with physical uplink control channel (PUCCH) resources. Unlike the CA for which a UE 102 should cope with a delay spread of up to 30.26 µs among the component carriers, two operations are defined for the DC: synchronous and asynchronous DC. In synchronous DC operation, the UE 102 can cope with a maximum reception timing difference up to at least 33 µs between cell groups (CGs). In asynchronous DC operation, the UE 102 can cope with a maximum reception timing difference up to 500 µs between CGs.

Even in the case that DC is not configured, one or more PUCCH cell group(s) can be configured. A PUCCH cell group having a PCell may be referred to as a MCG or master PUCCH cell group (MPCG). The other cell group(s) may be referred to as a SCG or secondary PUCCH cell group (SPCG). Each SCG (or SPCG) may include a PSCell, on which a PUCCH transmission(s) for the SCG (or SPCG) can be performed.

A downlink physical channel may correspond to a set of resource elements carrying information originating from higher layers. The following downlink physical channels may be defined. A physical downlink shared channel (PDSCH) may carry a transport block provided by a higher layer. The transport block may contain user data, higher layer control messages, physical layer system information. The scheduling assignment of PDSCH in a given subframe may normally be carried by PDCCH or EPDCCH in the same subframe.

A physical broadcast channel (PBCH) may carry a master information block, which is required for an initial access.

A physical multicast channel (PMCH) may carry Multimedia Broadcast Multicast Services (MBMS) related data and control information.

A physical control format indicator channel (PCFICH) may carry a control format indicator (CFI) specifying the number of OFDM symbols on which PDCCHs are mapped.

A physical downlink control channel (PDCCH) may carry a scheduling assignment (also referred to as a DL grant) or an UL grant. The PDCCH may be transmitted via the same antenna port (e.g., Cell-Specific Reference Signal (CRS) port) as the PBCH.

A physical hybrid ARQ indicator channel (PHICH) may carry UL-associated HARQ-ACK information.

An enhanced physical downlink control channel (EPDCCH) may carry a scheduling assignment or an UL grant. The EPDCCH may be transmitted via a different antenna port (e.g., Demodulation RS (DM-RS) port) from the PBCH and PDCCH. Possible REs on which EPDCCHs are mapped may be different from those for PDCCH, though they may partially overlap.

A downlink physical signal may correspond to a set of resource elements used by the physical layer but may not carry information originating from higher layers.

A cell-specific reference signal (CRS) may be assumed to be transmitted in all downlink subframes and DwPTS. For a normal subframe with normal CP, a CRS may be mapped on REs that are located in the 1st, 2nd, and 5th OFDM symbols in each slot. A CRS may be used for demodulation of the PDSCH, Channel State Information (CSI) measurement and Radio Resource Management (RRM) measurement.

A CSI reference signal (CSI-RS) may be transmitted in the subframes that are configured by higher layer signaling. The REs on which a CSI-RS is mapped are also configured by higher layer signaling. A CSI-RS may be further classified into non zero power (NZP) CSI-RS and ZP (zero power) CSI-RS. A part of a ZP CSI-RS resources may be configured as a CSI interference measurement (CSI-IM) resource, which may be used for interference measurement.

A UE-specific RS (UE-RS) may be assumed to be transmitted in physical resource block (PRB) pairs that are allocated for the PDSCH intended to the UE 102. UE-RS may be used for demodulation of the associated PDSCH.

A Demodulation RS (DM-RS) may be assumed to be transmitted in PRB pairs that are allocated for EPDCCH transmission. DM-RS may be used for demodulation of the associated EPDCCH.

Primary/secondary synchronization signals may be transmitted to facilitate the UE's 102 cell search, which is the procedure by which the UE 102 acquires time and frequency synchronization with a cell and detects the physical layer Cell ID of that cell. E-UTRA cell search supports a scalable overall transmission bandwidth corresponding to 6 resource blocks and upwards.

A discovery signal may consist of CRS, primary/secondary synchronization signals NZP-CSI-RS (if configured). The UE 102 may assume a discovery signal occasion once every discovery reference signal (DRS) measurement timing configuration (DMTC)-Periodicity. The eNB 160 using cell on/off may adaptively turn the downlink transmission of a cell on and off. A cell whose downlink transmission is turned off may be configured as a deactivated SCell for a UE 102. A cell performing on/off may transmit only periodic discovery signals and UEs 102 may be configured to measure the discovery signals for RRM. A UE 102 may perform RRM measurement and may discover a cell or transmission point of a cell based on discovery signals when the UE 102 is configured with discovery-signal-based measurements.

In Rel-12, there are ten transmission modes. These transmission modes may be configurable for a Licensed-Assisted Access (LAA) SCell. These transmission modes are illustrated in Table 1.

TABLE 1

| Transmission mode | Downlink Control Information (DCI) format | Transmission scheme |
|---|---|---|
| Mode 1 | DCI format 1A | Single antenna port |
|  | DCI format 1 | Single antenna port |
| Mode 2 | DCI format 1A | Transmit diversity |
|  | DCI format 1 | Transmit diversity |
| Mode 3 | DCI format 1A | Transmit diversity |
|  | DCI format 2A | Large delay Cyclic Delay Diversity (CDD) or Transmit diversity |
| Mode 4 | DCI format 1A | Transmit diversity |
|  | DCI format 2 | Closed-loop spatial multiplexing or Transmit diversity |
| Mode 5 | DCI format 1A | Transmit diversity |
|  | DCI format 1D | Multi-user Multiple-Input Multiple-Output (MIMO) |
| Mode 6 | DCI format 1A | Transmit diversity |
|  | DCI format 1B | Closed-loop spatial multiplexing using a single transmission layer |
| Mode 7 | DCI format 1A | Single-antenna port (for a single CRS port), transmit diversity (otherwise) |
|  | DCI format 1 | Single-antenna port |
| Mode 8 | DCI format 1A | Single-antenna port (for a single CRS port), transmit diversity (otherwise) |
|  | DCI format 2B | Dual layer transmission or single-antenna port |
| Mode 9 | DCI format 1A | Single-antenna port (for a single CRS port or multicast-broadcast single-frequency network (MBSFN) subframe), transmit diversity (otherwise) |
|  | DCI format 2C | Up to 8 layer transmission or single-antenna port |
| Mode 10 | DCI format 1A | Single-antenna port (for a single CRS port or MBSFN subframe), transmit diversity (otherwise) |
|  | DCI format 2D | Up to 8 layer transmission or single-antenna port |

In Rel-12, there are sixteen DCI formats. DCI format 1, 1A, 1B, 1C, 1D, 2, 2A, 2B, 2C, and 2D may be used for DL assignment (also referred to as DL grant). The DCI formats are illustrated in Table 2.

TABLE 2

| DCI format | Use |
|---|---|
| DCI format 0 | scheduling of PUSCH in one UL cell |
| DCI format 1 | scheduling of one PDSCH codeword in one cell |
| DCI format 1A | compact scheduling of one PDSCH codeword in one cell and random access procedure initiated by a PDCCH order |
| DCI format 1B | compact scheduling of one PDSCH codeword in one cell with precoding information |
| DCI format 1C | very compact scheduling of one PDSCH codeword, notifying Multicast Control Channel (MCCH) change, and reconfiguring TDD |
| DCI format 1D | compact scheduling of one PDSCH codeword in one cell with precoding and power offset information |
| DCI format 1A | Transmit diversity |
| DCI format 2 | scheduling of up to two PDSCH codewords in one cell with precoding information |
| DCI format 2A | scheduling of up to two PDSCH codewords in one cell |
| DCI format 2B | scheduling of up to two PDSCH codewords in one cell with scrambling identity information |
| DCI format 2C | scheduling of up to two PDSCH codewords in one cell with antenna port, scrambling identity and number of layers information |
| DCI format 2D | scheduling of up to two PDSCH codewords in one cell with antenna port, scrambling identity and number of layers information and PDSCH RE Mapping and Quasi-Co-Location Indicator (PQI) information |

TABLE 2-continued

| DCI format | Use |
|---|---|
| DCI format 3 | transmission of transmitter power control (TPC) commands for PUCCH and PUSCH with 2-bit power adjustments |
| DCI format 3A | transmission of TPC commands for PUCCH and PUSCH with single bit power adjustments |
| DCI format 4 | of PUSCH in one UL cell with multi-antenna port transmission mode |
| DCI format 5 | scheduling of Physical Sidelink Broadcast Channel (PSCCH), and also contains several Sidelink Control Information (SCI) format 0 fields used for the scheduling of Physical Sidelink Shared Channel (PSSCH) |

DCI format 1, 1A, 1B, 1C, 1D may include the bit fields provided in Table 3, where $N^{DL}_{RB}$ a downlink system bandwidth (BW) of the serving cell, which is expressed in multiples of PRB (physical resource block) bandwidth.

TABLE 3

| | DCI F 1 | DCI F 1A | DCI F 1B | DCI F 1C | DCI F 1D |
|---|---|---|---|---|---|
| Carrier Indicator Field (CIF) | 0 or 3 | 0 or 3 | 0 or 3 | N/A | 0 or 3 |
| Flag for format0/1A differentiation | N/A | 1 | N/A | N/A | N/A |
| Localized/Distributed Virtual Resource Block (VRB) assignment flag | N/A | 1 | 1 | N/A | 1 |
| Resource allocation header | 1 | N/A | N/A | N/A | N/A |
| Gap value | N/A | N/A | N/A | 0 ($N^{DL}_{RB} < 50$) or 1 (otherwise) | N/A |
| Resource block assignment | * | ** | ** | *** | ** |
| Modulation and coding scheme | 5 | 5 | 5 | 5 | 5 |
| HARQ process number | 3 (FDD PCell) or 4 (TDD PCell) | 3 (FDD PCell) or 4 (TDD PCell) | 3 (FDD PCell) or 4 (TDD PCell) | N/A | 3 (FDD PCell) or 4 (TDD PCell) |
| New data indicator | 1 | 1 | 1 | N/A | 1 |
| Redundancy version | 2 | 2 | 2 | N/A | 2 |
| TPC command for PUCCH | 2 | 2 | 2 | N/A | 2 |
| Downlink Assignment Index | 0 (FDD PCell) or 2 (otherwise) | 0 (FDD PCell) or 2 (otherwise) | 0 (FDD PCell) or 2 (otherwise) | N/A | 0 (FDD PCell) or 2 (otherwise) |
| Sounding Reference Signal (SRS) request | N/A | 0 or 1 | N/A | N/A | N/A |
| Downlink power offset | N/A | N/A | N/A | N/A | 1 |
| Transmitted Precoding Matrix Indicator (TPMI) information for precoding | N/A | N/A | 2 (2 CRS ports) or 4 (4 CRS ports) | N/A | 2 (2 CRS ports) or 4 (4 CRS ports) |
| HARQ-ACK resource offset | 2 (EPDCCH) or 0 (PDCCH) | 2 (EPDCCH) or 0 (PDCCH) | 2 (EPDCCH) or 0 (PDCCH) | N/A | 2 (EPDCCH) or 0 (PDCCH) |

It should be noted that * is ceil($N^{DL}_{RB}/P$) bits, where P is determined from Table 4;  is ceil($\log_2(N^{DL}_{RB}(N^{DL}_{RB}+1)/2)$) bits; and * is ceil($\log_2(\text{floor}(N^{DL}_{VRB,gap1}/N^{step}_{RB})(\text{floor}(N^{DL}_{VRB,gap1}/N^{step}_{RB})+1)/2)$) bits, where $N^{DL}_{VRB,gap1}=2*\min(N_{gap}, N^{DL}_{RB}-N_{gap})$ and $N^{DL}_{RB}$ is determined from Table 5.

TABLE 4

| System BW $N^{DL}_{RB}$ | precoding resource block group (PRG) size P |
|---|---|
| <=10 | 1 |
| 11-26 | 2 |

TABLE 4-continued

| System BW $N^{DL}_{RB}$ | precoding resource block group (PRG) size P |
|---|---|
| 27-63 | 3 |
| 64-110 | 4 |

TABLE 5

| System BW $N^{DL}_{RB}$ | $N^{step}_{RB}$ |
|---|---|
| 6-49 | 2 |
| 50-110 | 4 |

DCI format 2, 2A, 2B, 2C, 2D may include the bit fields provided in Table 6.

TABLE 6

| | DCI F 2 | DCI F 2A | DCI F 2B | DCI F 2C | DCI F 2D |
|---|---|---|---|---|---|
| CIF | 0 or 3 | 0 or 3 | 0 or 3 | 0 or 3 | 0 or 3 |
| Resource allocation header | 1 | 1 | 1 | 1 | 1 |
| Resource block assignment | * | * | * | * | * |
| TPC command for PUCCH | 2 | 2 | 2 | 2 | 2 |
| Downlink Assignment Index | 0 (FDD PCell) or 2 (otherwise) | 0 (FDD PCell) or 2 (otherwise) | 0 (FDD PCell) or 2 (otherwise) | 0 (FDD PCell) or 2 (otherwise) | 0 (FDD PCell) or 2 (otherwise) |
| HARQ process number | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) | 3 (FDD PCell) or 4 (TDD PCell) |
| Scrambling identity | N/A | N/A | 1 | N/A | N/A |
| Antenna port, scrambling identity and number of layers | N/A | N/A | N/A | 3 | 3 |
| SRS request | N/A | N/A | 0 or 1 | 0 or 1 | N/A |
| Transport block to codeword swap flag | 1 | 1 | N/A | N/A | |
| Modulation and coding scheme (TB1) | 5 | 5 | 5 | 5 | 5 |
| New data indicator (TB1) | 1 | 1 | 1 | 1 | 1 |
| Redundancy version (TB1) | 2 | 2 | 2 | 2 | 2 |
| Modulation and coding scheme (TB2) | 5 | 5 | 5 | 5 | 5 |
| New data indicator (TB2) | 1 | 1 | 1 | 1 | 1 |
| Redundancy version (TB2) | 2 | 2 | 2 | 2 | 2 |
| PDSCH RE Mapping and Quasi-Co-Location Indicator | N/A | N/A | N/A | N/A | 2 |
| Precoding information | 3 (2 CRS ports) or 6 (4 CRS ports) | 0 (2 CRS ports) or 2 (4 CRS ports) | N/A | N/A | N/A |
| HARQ-ACK resource offset | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) | 2 (EPDCCH) or 0 (PDCCH) |

The UE's 102 MAC procedure may include the following operations. Downlink shared channel (DL-SCH) data transfer may include DL assignment reception and HARQ operation. For the DL assignment reception, downlink assignments transmitted on the PDCCH indicate if there is a transmission on a DL-SCH for a particular MAC entity and provide the relevant HARQ information.

For the HARQ operation, there may be one HARQ entity at the MAC entity for each serving cell that maintains a number of parallel HARQ processes. Each HARQ process may be associated with a HARQ process identifier. The HARQ entity may direct HARQ information and associated TBs received on the DL-SCH to the corresponding HARQ processes. If a downlink assignment has been indicated for this TTI, the MAC entity may allocate the TB(s) received from the physical layer and the associated HARQ information to the HARQ process indicated by the associated HARQ information. If this is a new transmission, the MAC entity may then attempt to decode the received data. If this is a retransmission, the MAC entity may then combine the received data with the data currently in the soft buffer for this TB and attempts to decode the combined data.

The UE's 102 MAC procedure may also include UL-SCH data transfer. This may include a UL grant reception; HARQ operation; and multiplexing and assembly. For UL grant reception, in order to transmit on the UL-SCH the MAC entity must have a valid uplink grant (except for non-adaptive HARQ retransmissions) which it may receive dynamically on the PDCCH or in a random access response or which may be configured semi-persistently. To perform requested transmissions, the MAC layer may receive HARQ information from lower layers. When the physical layer is configured for uplink spatial multiplexing, the MAC layer may receive up to two grants (one per HARQ process) for the same TTI from lower layers.

For HARQ operation, there may be one HARQ entity at the MAC entity for each serving cell with a configured uplink, which maintains a number of parallel HARQ processes allowing transmissions to take place continuously while waiting for the HARQ feedback on the successful or unsuccessful reception of previous transmissions. At a given TTI, if an uplink grant is indicated for the TTI, the HARQ entity may identify the HARQ process(es) for which a transmission should take place. It may also route the received HARQ feedback (i.e., acknowledgment/negative acknowledgment (ACK/NACK) information), modulation and coding scheme (MCS) and resource, relayed by the physical layer, to the appropriate HARQ process(es). For each TTI, the HARQ entity may identify the HARQ process(es) associated with this TTI.

For multiplexing and assembly, RRC may control the scheduling of uplink data by signaling for each logical channel. An increasing priority value may indicate a lower priority level, prioritisedBitRate may set the prioritized bit rate (PBR), bucketSizeDuration may set the bucket size duration (BSD).

The MAC entity may maintain a variable Bj for each logical channel j. Bj may be initialized to zero when the related logical channel is established, and may be incremented by the product PBR×TTI duration for each TTI, where PBR is the prioritized bit rate of logical channel j. However, the value of Bj may never exceed the bucket size and if the value of Bj is larger than the bucket size of logical channel j, Bj may be set to the bucket size. The bucket size of a logical channel is equal to PBR×BSD, where PBR and BSD are configured by upper layers.

When a Scheduling Request (SR) is triggered, it may be considered as pending until it is cancelled. All pending SR(s) may be cancelled and sr-ProhibitTimer may be stopped when a MAC Protocol Data Unit (PDU) is assembled and this PDU includes a Buffer Status Report (BSR) that contains a buffer status up to (and including) the last event that triggered a BSR or, if all pending SR(s) are triggered by a sidelink BSR, when a MAC PDU is assembled and this PDU includes a sidelink BSR which contains buffer status up to (and including) the last event that triggered a sidelink BSR, or, if all pending SR(s) are triggered by a sidelink BSR, when upper layers configure autonomous resource selection, or when the UL grant(s) can accommodate all pending data available for transmission.

A buffer status reporting procedure may be used to provide the serving eNB 160 with information about the amount of data available for transmission in the UL buffers associated with the MAC entity. RRC controls BSR reporting by configuring three timers (e.g., periodicBSR-Timer, retxBSR-Timer and logicalChannelSR-ProhibitTimer) and by, for each logical channel, optionally signaling logicalChannelGroup, which allocates the logical channel to a logical channel group (LCG).

A power headroom reporting procedure may be used to provide the serving eNB 160 with information about the difference between the nominal UE maximum transmit power and the estimated power for UL-SCH transmission per activated serving cell and also with information about the difference between the nominal UE maximum power and the estimated power for UL-SCH and PUCCH transmission on a SpCell.

The transmit power control for shortened TTI may be defined. The setting of the UE transmit power for a physical uplink shared channel (PUSCH) transmission is defined as follows. If the UE 102 transmits PUSCH without a simultaneous physical uplink control channel (PUSCH) for the serving cell c, then the UE transmit power $\hat{P}_{PUSCH,c}(i)$ for PUSCH transmission in subframe i for the serving cell c may be given by $$\hat{P}_{PUSCH,c}(i) = \min\begin{cases} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [\text{dBm}].$$

If the UE 102 transmits PUSCH simultaneous with PUCCH for the serving cell c, then the UE transmit power $P_{PUSCH,c}(i)$ for the PUSCH transmission in subframe i for the serving cell c may be given by $$P_{PUSCH,c}(i) = \min\begin{cases} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{cases} [\text{dBm}].$$

If the UE 102 is not transmitting PUSCH for the serving cell c, for the accumulation of a transmitter power control (TPC) command received with DCI format 3/3A for PUSCH, the UE 102 may assume that the UE transmit power $P_{PUSCH,c}(i)$ for the PUSCH transmission in subframe i for the serving cell c is computed by $$P_{PUSCH,c}(i) = \min\{P_{CMAX,c}(i), P_{O\_PUSCH,c}(1) + \alpha_c(1) \cdot PL_c + f_c(i)\} \, [\text{dBm}].$$

$P_{CMAX,c}(i)$ is the configured UE transmit power in subframe i for serving cell c and $\hat{P}_{CMAX,c}(i)$ is the linear value of $P_{CMAX,c}(i)$. $\hat{P}_{PUCCH}(i)$ is the linear value of $P_{PUCCH}(i)$ $M_{PUSCH,c}(i)$ is the bandwidth of the PUSCH resource assignment expressed in the number of resource blocks valid for subframe i and serving cell c. $P_{O\_PUSCH,c}(j)$ is a parameter composed of the sum of a component $P_{O\_NOMINAL\_PUSCH,c}(j)$ provided from higher layers for j=0 and 1 and a component $P_{O\_UE\_PUSCH,c}(j)$ provided by higher layers for j=0 and 1 for serving cell c. For j=0 or 1, $\alpha_c \in \{0, 0.4, 0.5, 0.6, 0.7, 0.8, 0.9, 1\}$ is a 3-bit parameter provided by higher layers for serving cell c. For j=2, $\alpha_c(j)$=1. $PL_c$ is the downlink path loss estimate calculated in the UE for serving cell c in dB and $PL_c$=referenceSignalPower−higher layer filtered Reference Signal Received Power (RSRP).

$\Delta_{TF,c}(i) = 10 \log_{10}((2^{BPRE \cdot K_s} - 1) \cdot \beta_{offset}^{PUSCH})$ for $K_S$=1.25 and 0 for $K_S$=0 where $K_S$ is given by the parameter delta-MCS-Enabled provided by higher layers for each serving cell c. $\delta_{PUSCH,c}$ is a correction value, also referred to as a TPC command and is included in PDCCH/EPDCCH with DCI format 0/4 for serving cell c or jointly coded with other TPC commands in PDCCH with DCI format 3/3A whose cyclic redundancy check (CRC) parity bits are scrambled with TPC-PUSCH-Radio Network Temporary Identifier (RNTI).

If serving cell c is the primary cell, for PUCCH format 1/1a/1b/2/2a/2b/3, the setting of the UE Transmit power $P_{PUCCH}$ for the physical uplink control channel (PUCCH) transmission in subframe i for serving cell c is defined by $$P_{PUCCH}(i) = \min \begin{cases} P_{CMAX,c}(i), \\ P_{0\_PUCCH} + PL_c + h(n_{CQI}, n_{HARQ}, n_{SR}) + \\ \Delta_{F\_PUCCH}(F) + \Delta_{TxD}(F') + g(i) \end{cases} [dBm]$$

If serving cell c is the primary cell, for PUCCH format 4/5, the setting of the UE Transmit power $P_{PUCCH}$ for the PUCCH transmission in subframe i for serving cell c is defined by $$P_{PUCCH}(i) = \min \begin{cases} P_{CMAX,c}(i), \\ P_{0\_PUCCH} + PL_c + 10\log_{10}(M_{PUCCH,c}(i)) + \\ \Delta_{TF,c}(i) + \Delta_{F\_PUCCH}(F) + g(i) \end{cases} [dBm]$$

If the UE 102 is not transmitting PUCCH for the primary cell, for the accumulation of the TPC command for PUCCH, the UE 102 may assume that the UE transmit power $P_{PUCCH}$ for PUCCH in subframe i is computed by $$P_{PUCCH}(i) = \min\{P_{CMAX,c}(i), P_{0\_PUCCH} + PL_c + g(i)\} \text{ [dBm]}$$

The parameter $\Delta_{F\_PUCCH}(F)$ is provided by higher layers. If the UE 102 is configured by higher layers to transmit PUCCH on two antenna ports, the value of $\Delta_{TxD}(F')$ is provided by higher layers where each PUCCH format F' is defined; otherwise, $\Delta_{TxD}(F')$=0. $h(n_{CQI}, n_{HARQ}, n_{SR})$ is a PUCCH format dependent value, where $n_{CQI}$ corresponds to the number of information bits for the channel quality information. $n_{SR}$=1 if subframe i is configured for SR for the UE 102 not having any associated transport block for UL-SCH, otherwise $n_{SR}$=0.

If the UE 102 is configured with more than one serving cell, or the UE 102 is configured with one serving cell and transmitting using PUCCH format 3, $n_{HARQ}$ is the number of HARQ-ACK bits sent in subframe i. $P_{O\_PUCCH}$ is a parameter composed of the sum of a parameter $P_{O\_NOMINAL\_PUCCH}$ provided by higher layers and a parameter $P_{O\_UE\_PUCCH}$ provided by higher layers. $\delta_{PUCCH}$ is a UE specific correction value, also referred to as a TPC command, included in a PDCCH with DCI format 1A/1B/1D/1/2A/2/2B/2C/2D for the primary cell, or included in an EPDCCH with DCI format 1A/1B/1D/1/2A/2/2B/2C/2D for the primary cell, or sent jointly coded with other UE specific PUCCH correction values on a PDCCH with DCI format 3/3A whose CRC parity bits are scrambled with TPC-PUCCH-RNTI.

If the UE 102 is not configured with an SCG or a PUCCH-SCell, and if the total transmit power of the UE 102 would exceed $\hat{P}_{CMAX}(i)$, the UE 102 may scale $\hat{P}_{PUSCH,c}(i)$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i))$$

is satisfied where $\hat{P}_{PUCCH}(i)$ is the linear value of $P_{PUCCH}(i)$, $\hat{P}_{PUSCH,c}(i)$ is the linear value of $P_{PUSCH,c}(i)$, $\hat{P}_{CMAX}(i)$ is the linear value of the UE total configured maximum output power $P_{CMAX}$ in subframe i and w(i) is a scaling factor of $\hat{P}_{PUSCH,c}(i)$ for serving cell c where $0 \leq w(i) \leq 1$. In case there is no PUCCH transmission in subframe i, $\hat{P}_{PUCCH}(i)$=0.

If the UE 102 is not configured with an SCG or a PUCCH-Scell, and if the UE 102 has PUSCH transmission with UCI on serving cell j and PUSCH without UCI in any of the remaining serving cells, and the total transmit power of the UE would exceed $\hat{P}_{CMAX}(i)$, the UE 102 scales $\hat{P}_{PUSCH,c}(i)$ for the serving cells without UCI in subframe i such that the condition $$\sum_{c \neq j} w(i) \cdot \hat{P}_{PUSCH,c}(i) \leq (\hat{P}_{CMAX}(i) - \hat{P}_{PUSCH,j}(i))$$

is satisfied where $\hat{P}_{PUSCH,c}(i)$ is the PUSCH transmit power for the cell with UCI and w(i) is a scaling factor of $\hat{P}_{PUSCH,c}(i)$ for serving cell c without UCI. In this case, no power scaling is applied to $\hat{P}_{PUSCH,j}(i)$ unless $$\sum_{c \neq j} w(i) \cdot \hat{P}_{PUSCH,c}(i) = 0$$

and the total transmit power of the UE 102 still would exceed $\hat{P}_{CMAX}(i)$.

For a UE 102 not configured with a SCG or a PUCCH-SCell, note that w(i) values are the same across serving cells when w(i)>0 but for certain serving cells w(i) may be zero.

If the UE 102 is not configured with an SCG or a PUCCH-SCell, and if the UE 102 has simultaneous PUCCH and PUSCH transmission with UCI on serving cell j and PUSCH transmission without UCI in any of the remaining serving cells, and the total transmit power of the UE 102 would exceed $\hat{P}_{CMAX}(i)$, the UE 102 may obtain $\hat{P}_{PUSCH,c}(i)$ according to $$\hat{P}_{PUSCH,j}(i) = \min(\hat{P}_{PUSCH,j}(i), (\hat{P}_{CMAX}(i) - \hat{P}_{PUCCH}(i))) \text{ and}$$

-continued $$\sum_{c \neq j} w(i) \cdot \hat{P}_{PUSCH,c}(i) \leq (\hat{P}_{CMAX}(i) - \hat{P}_{PUCCH}(i) - \hat{P}_{PUSCH,j}(i))$$

Soft channel bits may be stored. For FDD with normal TTI (without a shortened TTI configuration), there may be a maximum of 8 downlink HARQ processes per serving cell. For FDD-TDD with normal TTI and a primary cell frame structure type 1, there may be a maximum of 8 downlink HARQ processes per serving cell.

For TDD with normal TTI and a UE 102 not configured with the parameter EIMTA-MainConfigServCell-r12 for any serving cell, if the UE 102 is configured with one serving cell, or if the UE 102 is configured with more than one serving cell and the TDD UL/DL configuration of all the configured serving cells is the same, the maximum number of downlink HARQ processes per serving cell may be determined by the UL/DL configuration, as indicated in Table 7.

For TDD with normal TTI, if a UE 102 is configured with more than one serving cell and if the TDD UL/DL configuration of at least two configured serving cells is not the same, or if the UE 102 is configured with the parameter EIMTA-MainConfigServCell-r12 for at least one serving cell, or for FDD-TDD with normal TTI and a primary cell frame structure type 2 and serving cell frame structure type 2, the maximum number of downlink HARQ processes for a serving cell may be determined as indicated in Table 7. The "TDD UL/DL configuration" in Table 7 refers to the DL-reference UL/DL configuration for the serving cell.

For FDD-TDD and primary cell frame structure type 2 and serving cell frame structure type 1, the maximum number of downlink HARQ processes for the serving cell may be determined by the DL-reference UL/DL configuration for the serving cell, as indicated in Table 8. The dedicated broadcast HARQ process may not be counted as part of the maximum number of HARQ processes for FDD, TDD and FDD-TDD.

Table 7 provides the maximum number of DL HARQ processes for TDD. Table 8 provides the maximum number of DL HARQ processes for FDD-TDD, primary cell frame structure type 2, and serving cell frame structure type 1.

TABLE 7

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

TABLE 8

| DL-reference UL/DL Configuration | Maximum number of HARQ processes |
|---|---|
| 0 | 10 |
| 1 | 11 |
| 2 | 12 |
| 3 | 15 |
| 4 | 16 |
| 5 | 16 |
| 6 | 12 |

For FDD, TDD and FDD-TDD, and for normal TTI, if the UE 102 is configured with more than one serving cell or if the UE 102 is configured with a SCG, then for each serving cell, for at least $K_{MIMO} \cdot \min(M_{DL\_HARQ}, M_{limit})$ transport blocks, upon decoding failure of a code block of a transport block, the UE 102 may store received soft channel bits corresponding to a range of at least $w_k, w_{k+1}, \ldots, w_{mod(k+n_{SB}-1,N_{cb})}$, where:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right),$$

$w_k$ is the coded bit, C is the number of code blocks, $N_{cb}$ is the soft buffer size for the code block, $K_{MIMO}$ is the parameter which is set to either 1 or 2 based on transmission mode, and $M_{limit}$ is a constant equal to 8. $M_{DL\_HARQ}$ is the maximum number of DL HARQ processes.

If the UE 102 is configured with a SCG, $N^{DL}_{cells}$ is the number of configured serving cells across both the MCG and the SCG. Otherwise, $N^{DL}_{cells}$ is the number of configured serving cells. $N'_{soft}$ is the total number of soft channel bits based on UE category of the UE 102.

In determining k, the UE 102 may give priority to storing soft channel bits corresponding to lower values of k. $w_k$ may correspond to a received soft channel bit. The range $w_k, w_{k+1}, \ldots, w_{mod(k+n_{SB}-1,N_{cb})}$ may include subsets not containing received soft channel bits.

For the UE 102 configured with the shortened TTI, one of the following approaches may be applied. In a first approach (Approach 1), the maximum number of HARQ processes is the same as for the UE 102 not configured with the shortened TTI. HARQ process indices may be shared between the normal TTI based and shortened TTI based transmissions. In other words, each of HARQ process indices may correspond to the normal TTI based transmission or may correspond to the shortened TTI based transmission. The number of stored soft channel bits for both the normal TTI based and shortened TTI based transmissions may be derived using the same equation as described above. The eNB 160 can assign up to $M_{DL\_HARQ}$ processes including both of the normal TTI based and shortened TTI processes for a single UE 102. The 3 or 4 bit HARQ process number field for the normal TTI can be reused for indicating the HARQ process number field for the shortened TTI.

In a second approach (Approach 2), the actual maximum number of HARQ processes (i.e., total number of HARQ processes for the normal TTI based and shortened TTI based transmissions) increases compared with the case for the UE 102 not configured with the shortened TTI. A new set of HARQ process indices may be introduced for shortened TTI based transmission. The number of stored soft channel bits for the normal TTI based transmission may be derived using the same equation as described above. The number of stored soft channel bits for the shortened TTI based transmission is derived using the same equation as described above with replacing $M_{DL\_HARQ}$ with $M_{DL\_HARQ}^{shorten}$, which is the maximum number of DL HARQ processes for the shortened TTI based transmission. In this case, the eNB 160 may cope with the number of actual scheduled HARQ processes for the UE 102 so that the soft channel bits do not overflow.

In a third approach (Approach 3), the actual maximum number of HARQ processes (i.e., the total number of HARQ processes for the normal TTI based and shortened TTI based transmissions) increases compared with the case for the UE 102 not configured with the shortened TTI. A new set of HARQ process indices may be introduced for shortened TTI based transmission. The number of stored soft channel bits for both the normal TTI based and shortened TTI based transmissions are derived using the same equation as described above with replacing $M_{DL\_HARQ}$ with $M_{DL\_HARQ} + M_{DL\_HARQ}^{shorten}$. Alternatively, the following equation may be used.

$$n_{SB} = \min\left(N'_{cb}, \left\lfloor \frac{N'_{soft}}{C' \cdot N_{cells}^{DL,shorten} \cdot K_{MIMO} \cdot \min(M_{DL\_HARQ}^{shorten}, M'_{limit})} \right\rfloor\right),$$

where C' is the number of code blocks for the shortened TTI based transmission, $N'_{cb}$ is the soft buffer size which is smaller than $N_{cb}$, $N_{cells}^{DL,shorten}$ is the number of serving cells for which the shortened TTI is configured, and $M'_{limit}$ is a constant that may or may not be equal to $M_{limit}$. Alternatively, $M'_{limit}$ is derived from a constant value (e.g., 8) and the shortened TTI length configuration. For example, $M'_{limit}$ could be set to floor(8·x), where x=2 for slot long TTI, x=4 for 3 or 4 OFDM symbols long TTI, and x=7 for 2 OFDM symbols long TTI. In this approach, the UE 102 capable of shortened physical downlink shared channel (SPDSCH) reception may have to have a dedicated soft buffer for SPDSCH on top of the one for normal PDSCH.

In a fourth approach (Approach 4), the maximum number of HARQ processes for the normal TTI based transmissions decreases compared with the case for the UE 102 not configured with the shortened TTI. The room due to the reduction of the maximum number of HARQ processes for the normal TTI based transmission is used for HARQ processes for the shortened TTI based transmissions. To be more specific, the maximum number of HARQ processes for the normal TTI based transmission may be $M_{DL\_HARQ}-X$. The number of stored soft channel bits for the shortened TTI based transmission may be derived using the same equation as described above. X may be a constant value such as 4. Alternatively, X may be the value derived from $M_{DL\_HARQ}$ (e.g., floor($M_{DL\_HARQ}$/2) or $M_{DL\_HARQ}$-1. Yet alternatively, X may be configured via dedicated RRC message. The number of stored soft channel bits for the shortened TTI based transmission may be derived from the following equation.

$$n_{SB} = \min\left(N'_{cb}, \left\lfloor \frac{X \cdot N_{cb}}{C' \cdot N_{cells}^{DL,shorten} \cdot K_{MIMO} \cdot \min(M_{DL\_HARQ}^{shorten}, M'_{limit})} \right\rfloor\right)$$

When the UE 102 completes the configuration of the SPDSCH, the UE 102 may flush all buffers for DL reception and then may start to store SPDSCH soft bits. When the UE 102 completes the configuration of the shortened physical uplink shared channel (SPUSCH), the UE 102 may flush all buffers for UL transmission and then start to store SPUSCH bits.

For normal TTI, one TTI corresponds to one subframe, as is explained above. For example, for normal CP, one TTI consists of 14 OFDM symbols. An example of a physical channel structure for the normal TTI is described in connection with FIG. 7. An example of a retransmission cycle of a DL transport block (DL-TB) is described in connection with FIG. 8. An example of a retransmission cycle of a UL transport block (UL-TB) is described in connection with FIG. 9.

The length of a shortened TTI may be shorter than the normal TTI (e.g., 2-OFDM-symbol-long TTI, 1-slot-long TTI). Note that a 1-slot-long TTI is just one of the possible shortened TTI lengths. It may be the length of a few OFDM symbols (e.g. 2, 3 or 4). The configuration of shortened TTI may include a configuration of TTI length. Moreover, TTI lengths may be set for DL and UL independently.

The shortened TTI may bring a reduction of physical layer latency, since L1 and L2 functions may be operated with a TTI basis. Moreover, shortened TTI may be achieved by a configurability of TTI length. For example, through higher layer signaling, the eNB 160 may be able to configure, for the UE 102, with a TTI length, which is selected from several TTI length candidates including the shortened TTI lengths and the normal TTI length (i.e., 1 ms). The candidate value sets for DL and UL could be the same. Alternatively, they could be different.

An example of a physical channel structure for the shortened TTI is described in connection with FIG. 10. An example of a retransmission cycle of a DL-TB in case of shortened TTI is described in connection with FIG. 11. An example of a retransmission cycle of a UL-TB in a case of shortened TTI is described in connection with FIG. 12.

The shortened TTI may be configured per serving cell via dedicated RRC message. Whether or not the shortened TTI is applied may be configured per cell group (e.g., a PUCCH cell group or a DC cell group) via dedicated RRC message. Instead of configuration of the shortened TTI, any other configuration may be used. In this case, it may be determined which TTI is used (between the normal TTI or the shortened TTI) according to that configuration. It should be noted that in an MCG, the normal TTI may be used irrespective of whether or not the shortened TTI is configured for SCG.

The configuration of shortened physical downlink control channel (SPDCCH) is defined herein. For normal TTI, PDCCH and/or EPDCCH may carry a DL assignment that schedules PDSCH. For a shortened TTI, the SPDCCH may carry a DL assignment that schedules SPDSCH. An eNB 160 may send a dedicated RRC message specifying SPDCCH configuration to a UE 102. Upon configuration of the SPDCCH, the UE 102 may monitor SPDCCH. The SPDCCH configuration may include subframe pattern configuration; resource block assignment; reference signal sequence configuration; shortened physical uplink control channel (SPUCCH) resource start offset configuration; and/or RE mapping configuration.

After the SPDCCH configuration is established, the UE 102 may monitor SPDCCH, and the eNB 160 may transmit the SPDCCH intended for the UE 102. Here, monitoring of the SPDCCH may mean attempts to decode SPDCCH and check whether or not the SPDCCH is correctly detected.

A UE 102 not configured with SPDCCH may monitor PDCCH in common search space (CSS) and UE-specific search space. A UE 102 not configured with SPDCCH but configured with EPDCCH may monitor PDCCH in CSS and EPDCCH in EPDCCH UE-specific search space (USS) in subframes where EPDCCH monitoring is configured. The UE 102 may monitor PDCCH in CSS and USS in the other subframes.

For the serving cell on which EPDCCH is monitored, a UE 102 configured with SPDCCH may perform one of the following. The UE 102 may monitor SPDCCH only in the cell in which the UE 102 is configured with SPDCCH. The UE 102 may not monitor PDCCH or EPDCCH. This may be done for SCell, and another scheme may apply to PCell.

In another implementation, the UE 102 may monitor SPDCCH on top of full (E)PDCCH candidates. The full (E)PDCCH candidates are all (E)PDCCH candidates that are monitored by the UE 102 not configured with SPDCCH.

In yet another implementation, the UE 102 may monitor SPDCCH in SPDCCH USS and PDCCH in CSS. In this instance, the UE 102 may not monitor (E)PDCCH in USS.

In another implementation, the UE 102 may monitor SPDCCH in SPDCCH USS PDCCH in CSS and (E)PDCCH in limited USS where there could be the reduced number of (E)PDCCH candidates compared with all (E)PDCCH candidates which are monitored by the UE not configured with SPDCCH.

In yet another implementation, the UE 102 may monitor SPDCCH in some subframes and may monitor PDCCH in the other subframes. The configuration of the subframe set where the SPDCCH is monitored may be done by one of or a combination of the following manner. The subframe set may be configured through dedicated RRC signaling. The subframe set may be configured through dynamic signaling (e.g., physical (PHY) layer signaling such as a common PDCCH or a common SPDCCH). The subframe set may be configured using MeasSubframePttern-r10. The subframe set may be fixed, in which case the subframe set is determined depending on frame structure type and/or TDD UL/DL configuration of the serving cell.

In another implementation, the UE 102 may monitor PDCCH CSS and SPDCCH USS in some subframes and may monitor PDCCH in CSS and USS in the other subframes. The configuration of the subframe set where the SPDCCH is monitored may be done by the above-described manner.

For monitoring of both (E)PDCCH and SPDCCH, the UE 102 may use the same baseband signal, but hypotheses may be different. More specifically, when the UE 102 receives each OFDM symbol, the UE 102 may store the soft bit/symbol sequence extracted from the OFDM symbol. The stored soft bit/symbol sequence for each OFDM symbol may be commonly used for (E)PDCCH and SPDCCH detection attempts. When the UE 102 decodes (E)PDCCH, the UE 102 may use the soft bit/symbol sequences corresponding to the OFDM symbols on which the (E)PDCCH is mapped. When the UE 102 decodes SPDCCH, the UE 102 may use the soft bit/symbol sequences corresponding to the OFDM symbols on which the SPDCCH is mapped.

When the UE 102 successfully detects SPDCCH, the UE 102 may assume that the PRB pair where the SPDCCH or the corresponding SPDSCH was mapped is not used for PDCCH, EPDCCH, or PDSCH transmission in the same subframe. When the UE 102 successfully detects PDCCH, the UE 102 may assume that the PDCCH region where the PDCCH was detected is not used for SPDCCH or SPDSCH transmissions in the same subframe. When the UE 102 successfully detects PDCCH or EPDCCH, the UE 102 may assume that the PRB pair where the EPDCCH or the corresponding PDSCH was mapped is not used for SPDCCH or SPDSCH transmissions in the same subframe.

The eNB 160 may transmit the SPDCCH through the search space that the UE 102 monitors.

The (E)PDCCH carrying DL assignment or UL grant may be masked by using a Cell Radio Network Temporary Identifier (C-RNTI). In other words, CRC bits scrambling by C-RNTI may be attached to these (E)PDCCH. For the UE 102 configured with the shortened TTI, CRC bits scrambling by C-RNTI may be still attached to (E)PDCCH, which is used for normal TTI based transmission. Meanwhile, CRC bits scrambling by the different RNTI may be used for SPDCCH for shortened TTI based transmission. The RNTI may be configured via dedicated RRC message or could be a fixed value dedicated for the shortened TTI use. This RNTI may also be used to derive search space for SPDCCH monitoring. Alternatively, C-RNTI may be used even for SPDCCH.

Figure 13:
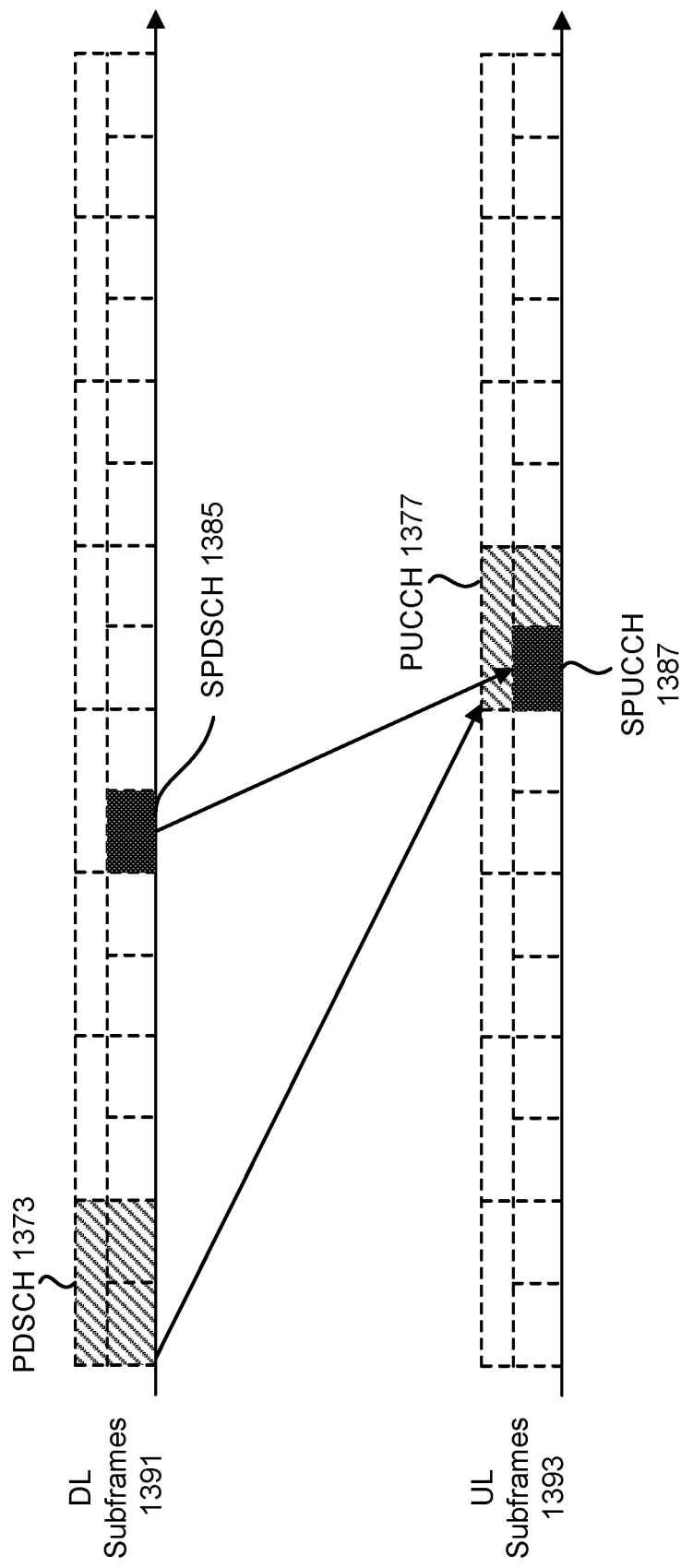
FIG. 13 illustrates an example of a collision of a physical uplink control channel (PUCCH) with a shortened physical uplink control channel (SPUCCH)

Collision of PUCCH and SPUCCH/SPUSCH timing is also described herein. In a serving cell, an eNB 160 may transmit a normal PDSCH and a SPDSCH for a single UE 102. Even if the UE 102 receives the normal PDSCH and the SPDSCH in different subframes, transmission timing of PUCCH corresponding to the PDSCH may collide with transmission timing of SPUCCH corresponding to the SPDSCH. To be more specific, the UE 102 receiving PDSCH in subframe n−4 may have to transmit PUCCH in subframe n. The UE 102 may also receive SPDSCH between subframe n−4 and subframe n, and the transmission timing for SPUCCH corresponding to the SPDSCH may be subframe n. FIG. 13 shows an example of this case.

In this case, the UE 102 may take one of the following options. In a first option, the UE 102 may transmit both PUCCH and SPUCCH in the same subframe. The eNB 160 may receive both in the same subframe. This option provides efficient HARQ processing for both of the normal TTI and the shortened TTI communications.

In a second option, the UE 102 may drop SPUCCH and transmit PUCCH carrying HARQ-ACK associated with the PDSCH. The eNB 160 may not receive SPUCCH but only PUCCH in the subframe. This option maintains high reliability for a fall back operation using normal TTI communication.

In a third option, the UE 102 may drop SPUCCH and transmit PUCCH carrying both HARQ-ACK associated with the PDSCH and HARQ-ACK associated with the SPDSCH. The eNB 160 may not receive SPUCCH but only PUCCH in the subframe. This option provides efficient HARQ processing for both of the normal TTI and the shortened TTI (S-TTI) communications. This may cause an association timing change of the S-TTI. For example in FIG. 13, the SPUCCH content is delayed for a slot and can only be received after the legacy PUCCH. Also, a legacy PUCCH may need to include feedback of multiple SPUCCHs. The legacy PUCCH format is another issue. For example with FDD, the legacy PUCCH is very likely a Format 1a/1b resource that cannot support many bits.

In a fourth option, the UE 102 may drop PUCCH and transmit SPUCCH carrying HARQ-ACK associated with the SPDSCH. The eNB 160 may not receive PUCCH but only SPUCCH in the subframe. This option reduces latency due to HARQ-ACK delay in shortened TTI communication.

In a fifth option, the UE 102 may drop PUCCH and transmit SPUCCH carrying both HARQ-ACK associated with the SPDSCH and HARQ-ACK associated with the PDSCH. The eNB 160 may not receive PUCCH but only SPUCCH in the subframe. This option provides efficient HARQ processing for both of the normal TTI and the shortened TTI communications.

In a sixth option, the UE 102 is not expected to receive SPDSCH corresponding to the SPUCCH which is to be transmitted in the same subframe as for PUCCH, when the UE 102 has received PDSCH and has to transmit the PUCCH. This option does not require the UE 102 to perform unnecessary processing. In other words, it is an eNB 160 implementation issue to avoid some kind of scheduling to a UE 102.

Figure 14:
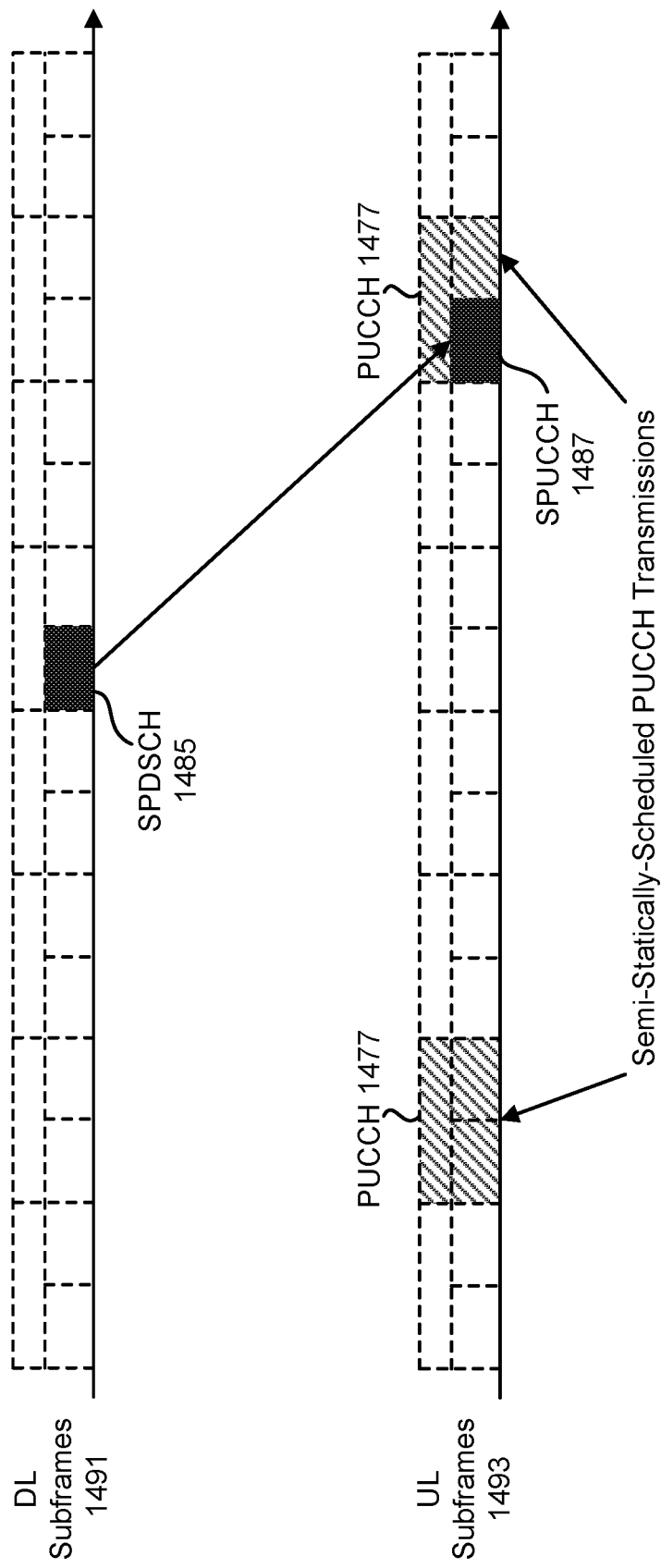
FIG. 14 illustrates an example of a collision of SPUCCH with semi-statically-scheduled PUCCH resources.

There may be other possibilities that PUCCH and SPUCCH/SPUSCH collide. For example, the UE 102 configured with periodic CSI reporting may have to transmit PUCCH in every m subframe. The UE 102 may receive SPDSCH, and the transmission timing for SPUCCH corresponding to the SPDSCH may be the same subframe as for the periodic CSI reporting. For another example, the UE 102 may be configured with PUCCH resources for Scheduling Request (SR) transmission. The UE 102 may receive SPDSCH, and the transmission timing for SPUCCH corresponding to the SPDSCH may be the same subframe as for PUCCH transmission carrying the SR. SPUCCH and SPUSCH might not support UCI transmission (e.g. CSI including Rank Indicator (RI), Precoding Matrix Indicator (PMI) and Channel Quality Indicator (CQI), and Scheduling Request (SR)) other than HARQ-ACK. FIG. 14 shows an example of this case.

In these cases, the UE 102 may take one of the following options. In a first option, the UE 102 may transmit both PUCCH and SPUCCH in the same subframe. The eNB 160 may receive both in the same subframe. This option provides efficient HARQ processing for both of the normal TTI and the shortened TTI communications.

In a second option, the UE 102 may drop SPUCCH and transmit PUCCH carrying CSI and/or SR. The eNB 160 may not receive SPUCCH but only PUCCH in the subframe. This option maintains high reliability for a fall back operation using normal TTI communication.

In a third option, the UE 102 may drop SPUCCH and transmit PUCCH carrying both CSI and/or SR and HARQ-ACK associated with the SPDSCH. The eNB 160 may not receive SPUCCH but only PUCCH in the subframe. This option provides efficient HARQ processing for both of the normal TTI and the shortened TTI communications.

In a fourth option, the UE 102 may drop PUCCH and transmit SPUCCH carrying HARQ-ACK associated with the SPDSCH. The eNB 160 may not receive PUCCH but only SPUCCH in the subframe. This option reduces latency due to HARQ-ACK delay in shortened TTI communication.

In a fifth option, the UE 102 may drop PUCCH and transmit SPUCCH carrying both HARQ-ACK associated with the SPDSCH and CSI and/or SR. The eNB 160 may not receive PUCCH but only SPUCCH in the subframe. This option provides efficient HARQ processing for both of the normal TTI and the shortened TTI communications.

In a sixth option, the UE 102 is not expected to receive SPDSCH corresponding to the SPUCCH which is to be transmitted in the same subframe as for PUCCH, when the UE 102 has received PDSCH and has to transmit the PUCCH. This option does not require the UE 102 to perform unnecessary processing.

In the above first option, the SPUCCH resource region may be set in a different frequency region from the PUCCH resource region. There could be several alternatives. In a first alternative, the eNB 160 may send the UE 102 an RRC message specifying a SPUCCH resource offset, which is configured independently from PUCCH resource offset. The UE 102 may derive the PUCCH resource from a control channel element (CCE) index and the PUCCH resource offset, while the UE 102 may derive SPUCCH resource from a shortened control channel element (SCCE) index and the SPUCCH resource offset.

In a second alternative, the eNB 160 may send the UE 102 an RRC message specifying the SPUCCH resource. The UE 102 may derive the PUCCH resource from a CCE index and the PUCCH resource offset, while the UE 102 may use the configured SPUCCH resource.

In a second alternative, the eNB 160 may send the UE 102 an RRC message specifying SPUCCH resource candidates. The UE 102 may derive a PUCCH resource from a CCE index and the PUCCH resource offset, while the UE 102 may use a SPUCCH resource selected from the configured SPUCCH resource candidates. The selection may be based on downlink control information carried by the SPDCCH.

Figure 15:
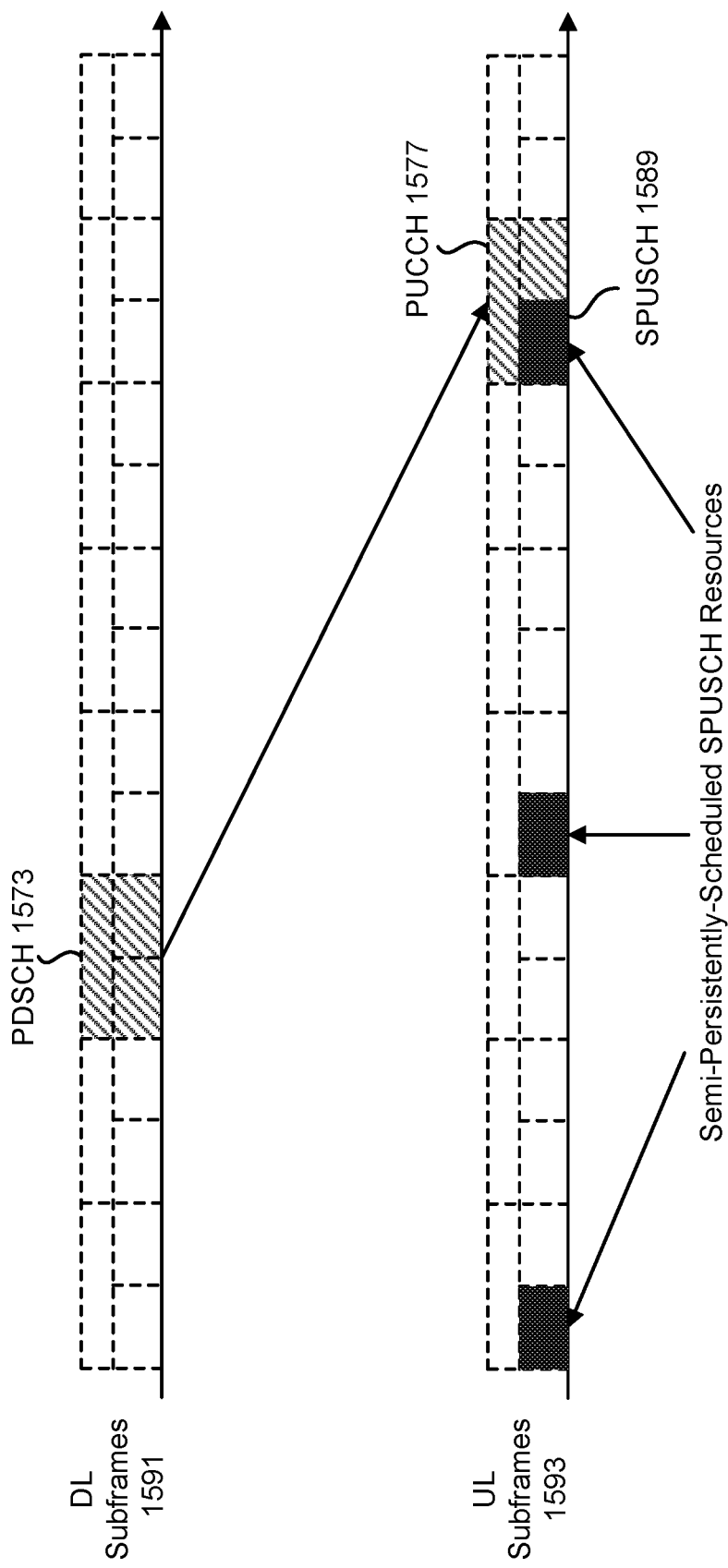
FIG. 15 illustrates an example of a collision of semi-persistently scheduled shortened physical uplink shared channel (SPUSCH) resources with PUCCH resources.

In another example, the UE 102 configured with semi-persistently scheduled SPUSCH resources may transmit SPUSCH in one of the resources. FIG. 15 shows an example of this case. The UE 102 may receive PDSCH, and the transmission timing for PUCCH corresponding to the PDSCH may be the same subframe as for the SPUSCH transmission. For another example, the UE 102 configured with semi-persistently scheduled SPUSCH resources may transmit SPUSCH in one of the resources. The UE 102 may receive (E)PDCCH carrying an UL grant, and the transmission timing for PUSCH corresponding to the (E)PDCCH may be the same subframe as for the SPUSCH transmission.

In this case, the UE 102 may take one of the following options. In a first option, the UE 102 may transmit both PUCCH and SPUSCH in the same subframe. The eNB 160 may receive both in the same subframe. This option provides efficient HARQ processing for both of the normal TTI and the shortened TTI communications.

In a second option, the UE 102 may drop SPUSCH and transmit PUCCH carrying HARQ-ACK associated with the PDSCH. The eNB 160 may not receive SPUSCH but only PUCCH in the subframe. This option maintains high reliability for a fall back operation using normal TTI communication.

In a third option, the UE 102 may drop PUCCH and transmit SPUSCH. The eNB 160 may not receive PUCCH but only SPUCCH in the subframe. This option reduces latency due to HARQ-ACK delay in shortened TTI communication.

In a fourth option, the UE 102 may drop PUCCH and transmit SPUSCH carrying HARQ-ACK associated with the PDSCH. The eNB 160 may not receive PUCCH but only SPUSCH in the subframe. This option provides efficient HARQ processing for both of the normal TTI and the shortened TTI communications.

In a fifth option, the UE 102 is not expected to receive PDSCH corresponding to the PUCCH which is to be transmitted in the same subframe as for possible SPUSCH, when the UE 102 is configured semi-persistently scheduled SPUSCH resources. This option does not require the UE 102 to perform unnecessary processing.

The power control assumes that the first option describe above for channel collision handling is used (i.e., the legacy TTI and the S-TTI channel are multiplexed and transmitted simultaneously). For power unlimited case, there is no issue for transmission with legacy TTI and S-TTI multiplexing. However, for a power limited case, the scenario where multiple S-TTIs may be included in a legacy TTI presents further issues. In this scenario, the power for each S-TTI PUCCH or PUSCH may be different. Furthermore, one or more of the channel collision and dropping rules described above may be used in a power limited case.

When the UE 102 transmits PUCCH/PUSCH and SPUCCH/SPUSCH in the same subframe, PUCCH/PUSCH transmission power may have to be taken into account for transmit power control of SPUCCH/SPUSCH. For example, transmit power of SPUCCH may be derived from either $$P_{SPUCCH}(i) = \min\begin{Bmatrix} P_{CMAX,c}(i), \\ P_{0\_SPUCCH} + PL_c + h(n_{HARQ}) + \\ \Delta_{F\_PUCCH}(F) + \Delta_{TxD}(F') + g(i) \end{Bmatrix} [dBm] \text{ or}$$

$$P_{SPUCCH}(i) = \min\begin{Bmatrix} P_{CMAX,c}(i), \\ P_{0\_SPUCCH} + PL_c + 10\log_{10}(M_{PUCCH,c}(i)) + \\ \Delta_{TF,c}(i) + \Delta_{F\_PUCCH}(F) + g(i) \end{Bmatrix} [dBm].$$

$P_{0\_SPUCCH}$ may be the same as $P_{0\_PUCCH}$. Alternatively, $P_{O\_SPUCCH}$ may be a parameter composed of the sum of a parameter $P_{O\_NOMINAL\_SPUCCH}$ provided by higher layers and a parameter $P_{O\_UE\_SPUCCH}$ provided by higher layers. $P_{SPUCCH}(i)$ may apply SPUCCH transmissions in all of shortened TTIs within subframe i. In other words, TPC commands for PUCCH may also apply the power control for SPUCCH.

If the UE 102 transmits PUSCH without a simultaneous PUCCH for the serving cell c, then the UE 102 transmit power $P_{PUSCH,c}(i)$ for SPUSCH transmission of any shortened TTI in subframe i for the serving cell c may be given by $$P_{SPUSCH,c}(i) = \min\begin{Bmatrix} P_{CMAX,c}(i), \\ 10\log_{10}(M_{SPUSCH,c}(i)) + P_{O\_SPUSCH,c}(j) + \\ \alpha_c(j) \cdot PL_c + \Delta_{TF,c}(i) + f_c(i) \end{Bmatrix} [dBm].$$

If the UE 102 transmits PUSCH simultaneous with PUCCH for the serving cell c, then the UE 102 transmit power $P_{PUSCH,c}(i)$ for the PUSCH transmission in subframe i for the serving cell c is given by $$P_{SPUSCH,c}(i) = \min\begin{Bmatrix} 10\log_{10}(\hat{P}_{CMAX,c}(i) - \hat{P}_{PUCCH}(i)), \\ 10\log_{10}(M_{SPUSCH,c}(i)) + P_{O\_SPUSCH,c}(j) + \\ \alpha_c(j) \cdot PL_c + \Delta_{TF,c}(i) + f_c(i) \end{Bmatrix} [dBm].$$

$M_{SPUSCH,c}$ and $P_{0\_SPUSCH,c}$ may be the same as $M_{PUSCH,c}$ and $P_{0\_PUSCH,c}$ respectively. Alternatively, they may be derived from the other set of higher layer parameters. $P_{SPUSCH,c}(i)$ may apply SPUSCH transmissions in all of shortened TTIs within subframe i. In other words, TPC commands for PUSCH may also apply the power control for SPUSCH.

Power allocation for SPUCCH may be prioritized over power allocation for PUSCH. For example, if the UE 102 is not configured with an SCG or a PUCCH-SCell, and if the total transmit power of the UE 102 would exceed $\hat{P}_{CMAX}(i)$, the UE 102 may scale $\hat{P}_{SPUCCH}(i)$ which is a linear scale value of $\hat{P}_{SPUCCH}(i)$, for the serving cell c in subframe i such that the condition $$\hat{P}_{SPUCCH}(i) = \min(P_{SPUCCH}(i),(\hat{P}_{CMAX}(i) - \hat{P}_{PUCCH}(i)).$$

In this case, if the UE 102 is not configured with an SCG or a PUCCH-SCell, and if the total transmit power of the UE 102 would exceed $\hat{P}_{CMAX}(i)$, the UE 102 may scale $\hat{P}_{PUSCH,c}$ for the serving cell c in subframe i such that the condition $$\sum_c w(i) \cdot \hat{P}_{PUSCH,c}(i) \leq (\hat{P}_{CMAX}(i) - \hat{P}_{PUCCH}(i) - \hat{P}_{SPUCCH}(i))$$

is satisfied.

Power allocation for SPUSCH may have the same priority as PUSCH without UCI. For example, if the UE 102 is not configured with an SCG or a PUCCH-SCell, and if the UE 102 has PUSCH transmission with UCI on serving cell j, PUSCH without UCI in any of the remaining serving cells and SPUSCH in any serving cell, and the total transmit power of the UE 102 would exceed $\hat{P}_{CMAX}(i)$, the UE 102 may scale $\hat{P}_{PUSCH,c}(i)$ and $\hat{P}_{SPUSCH,c}(i)$ for the serving cells without UCI in subframe i such that the condition $$\sum_{c \neq j} w(i) \cdot \hat{P}_{PUSCH,c}(i) + \sum_{c \neq j} w(i) \cdot \hat{P}_{PUSCH,c}(i) \leq$$
$$(\hat{P}_{CMAX}(i) - \hat{P}_{PUSCH,j}(i) - \hat{P}_{SPUCCH}(i))$$

is satisfied, where $$\hat{P}_{PUSCH,j}(i) = \min(\hat{P}_{PUSCH,j}(i),(\hat{P}_{CMAX}(i) - \hat{P}_{PUCCH}(i) - \hat{P}_{SPUCCH}(i))).$$

For a UE 102 not configured with a SCG or a PUCCH-SCell, note that w(i) values are the same across serving cells when w(i)>0 but for certain serving cells w(i) may be zero.

If the UE 102 is not configured with an SCG or a PUCCH-SCell, and if the UE 102 has simultaneous PUCCH and PUSCH transmission with UCI on serving cell j and PUSCH transmission without UCI in any of the remaining serving cells, and the total transmit power of the UE would exceed $\hat{P}_{CMAX}(i)$, the UE 102 may obtain $\hat{P}_{PUSCH,c}(i)$ and $P_{SPUSCH,c}(i)$ according to $$\sum_{c \neq j} w(i) \cdot \hat{P}_{PUSCH,c}(i) + \sum_{c \neq j} w(i) \cdot \hat{P}_{SPUSCH,c}(i) \leq$$
$$(\hat{P}_{CMAX}(i) - \hat{P}_{PUCCH}(i) - \hat{P}_{PUSCH,j}(i)).$$

Alternatively, the power allocation for SPUCCH may be de-prioritized over the power allocation for PUSCH with UCI but prioritized over the power allocation for PUSCH without UCI. For example, if the UE 102 is not configured with an SCG or a PUCCH-Scell, and if the UE 102 has PUSCH transmission with UCI on serving cell j, PUSCH without UCI in any of the remaining serving cells and SPUSCH in any serving cell, and the total transmit power of the UE 102 would exceed $\hat{P}_{CMAX}(i)$, the UE 102 may scale $P_{SPUCCH}(i)$ for the serving cells without UCI in subframe i such that the condition $$\hat{P}_{SPUCCH}(i) = \min(P_{SPUCCH}(i),(\hat{P}_{CMAX}(i) - \hat{P}_{PUSCH,j}(i)))$$

is satisfied, and the UE 102 may obtain $\hat{P}_{PUSCH,c}(i)$ and $\hat{P}_{SPUSCH,c}(i)$ according to $$\sum_{c \neq j} w(i) \cdot \hat{P}_{PUSCH,c}(i) + \sum_{c \neq j} w(i) \cdot \hat{P}_{SPUSCH,c}(i) \leq$$
$$(\hat{P}_{CMAX}(i) - \hat{P}_{PUCCH}(i) - \hat{P}_{PUSCH,j}(i) - \hat{P}_{SPUCCH}(i))$$

In yet another example, the power allocation for SPUCCH may be de-prioritized over the power allocation for PUSCH with UCI without UCI. In this case, if the total transmit power of the UE 102 would exceed $\hat{P}_{CMAX}(i)$, the UE 102 mass scale $\hat{P}_{SPUCCH}(i)$ for the serving cells without UCI in subframe i such that the condition $$\hat{P}_{SPUCCH}(i) = \min\left(\begin{array}{c}\hat{P}_{SPUCCH}(i), \\ \left(\hat{P}_{CMAX}(i) - \hat{P}_{PUCCH}(i) - \sum_c \hat{P}_{PUSCH,c}(i)\right)\end{array}\right)$$

is satisfied, and the UE 102 may obtain $\hat{P}_{SPUSCH,c}(i)$ according to $$\sum_c w(i) \cdot \hat{P}_{SPUSCH,c}(i) \leq \left(\hat{P}_{CMAX}(i) - \hat{P}_{PUCCH}(i) - \sum_c \hat{P}_{PUSCH,c}(i) - \hat{P}_{SPUCCH}(i)\right).$$

The above-described power control may achieve an efficient use of the UE's power.

Another solution to reduce latency is a shortened round trip time (RTT). In an implementation of shortened RTT, an interval between TB reception and HARQ-ACK transmission may be shorter than that of the normal RTT. In another implementation of shortened RTT, an interval between HARQ-ACK reception and TB retransmission may be shorter than that of the normal RTT. In yet another implementation of shortened RTT, both of these intervals are shorter. These implementations may use faster processing.

A retransmission cycle of a DL-TB with the shortened RTT is described in connection with FIG. 16. A retransmission cycle of a UL-TB with the shortened RTT is described in connection with FIG. 17.

For PUCCH transmissions for shortened RTT based HARQ processes, the PUCCH offset value other than the one for normal PUCCH transmission may be applied. The PUCCH offset for shortened RTT based HARQ processes may be configured via dedicated RRC signaling while the PUCCH offset for the normal RTT is provided through system information which is UE-common RRC signaling.

The above-described shortened TTI and shortened RTT may be applied independently. Alternatively, they can be applied simultaneously.

RTT lengths may be set for DL and UL independently. The shortened RTT may require faster processing. Moreover, shortened RTT may be achieved by a configurability of RTT length. For example, through higher layer signaling, the eNB 160 may be able to configure, for the UE 102, with a RTT length, which is selected from several RTT length candidates including the shortened RTT lengths (e.g., 4 ms) and the normal RTT length (e.g., 8 ms). The candidate value sets for DL and UL could be the same. Alternatively, they could be different.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of an eNB reduced latency module 194.

The eNB reduced latency module 194 may reduce latency through the use of a shortened transmission timing interval (TTI) and/or a shortened round trip time (RTT). In an implementation, the eNB reduced latency module 194 may configure, in a UE 102, a shortened TTI for a serving cell. The eNB reduced latency module 194 may receive a PUCCH on the serving cell. The eNB reduced latency module 194 may receive a SPUCCH on the serving cell. In a case that a transmission instance of the SPUCCH from the UE 102 collides with an uplink subframe where the PUCCH is to be transmitted by the UE 102, the eNB 160 may assume that the PUCCH is dropped and that the SPUCCH is transmitted.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode information 101, including transmission data 105.

The encoder 109 may encode transmission data 105 and/or other information included in the information 101 provided by the eNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2A:
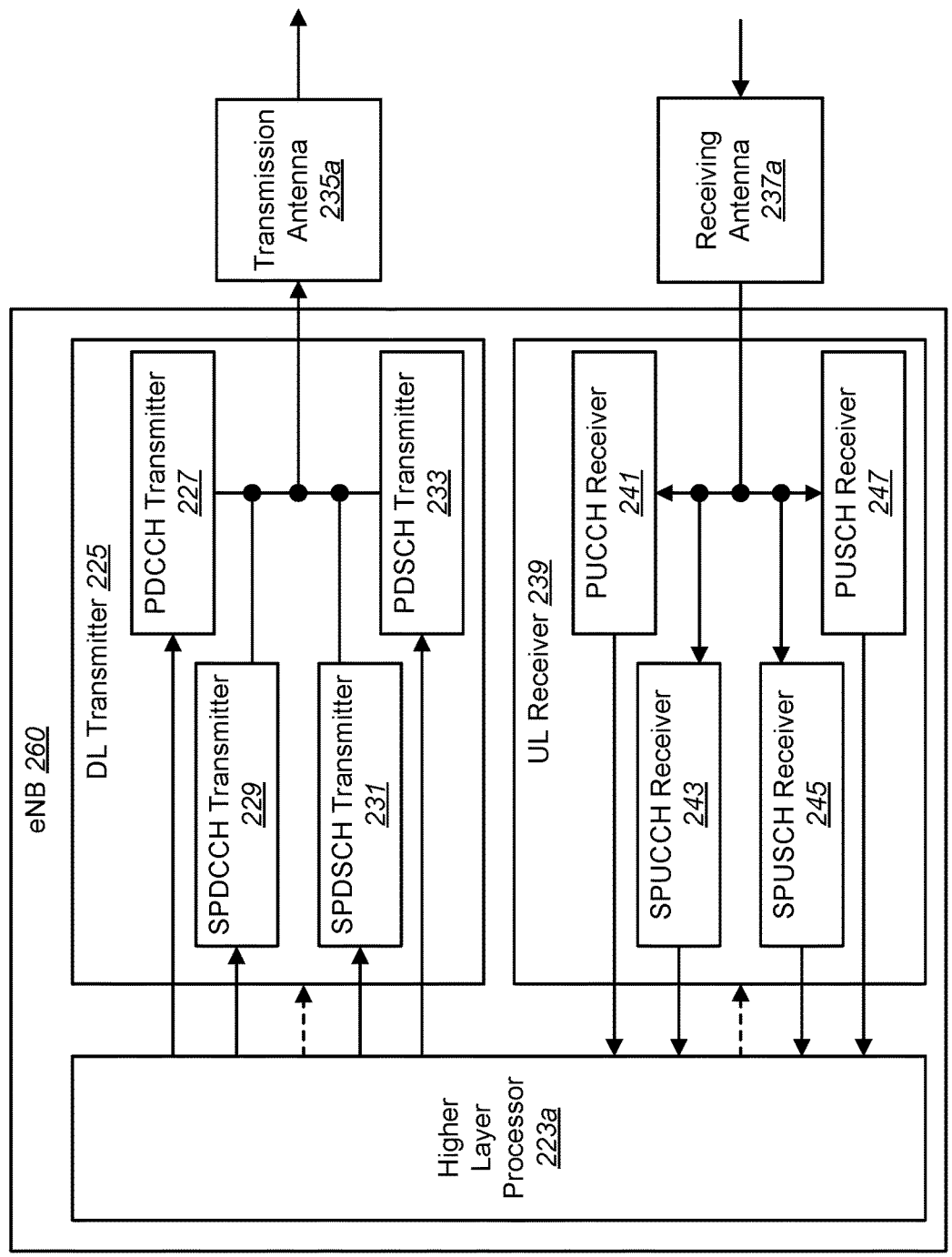
FIGS. 2A and 2B are block diagrams illustrating a detailed configuration of an eNB and a UE in which systems and methods for low latency radio communications may be implemented.
Figure 2B:
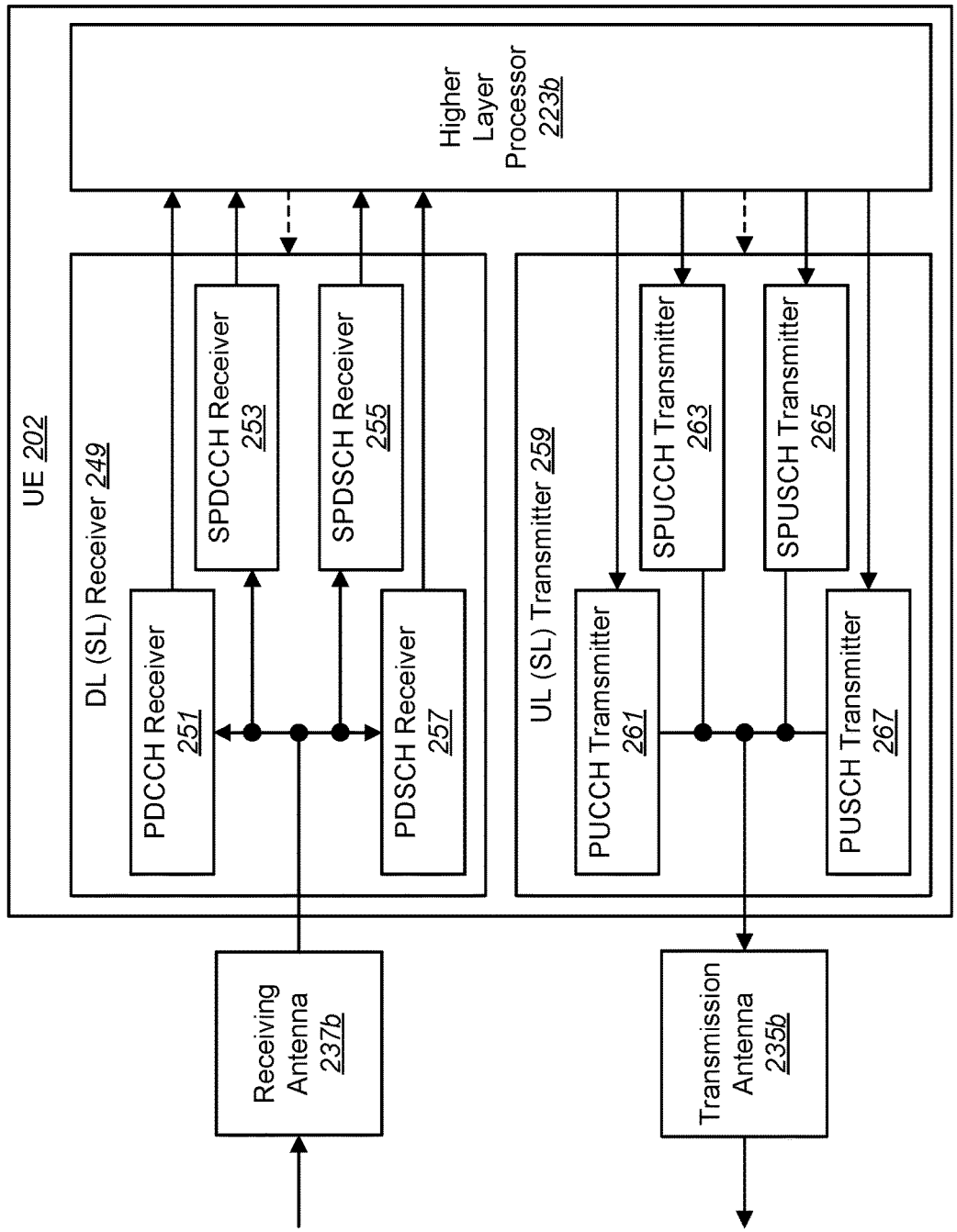

FIGS. 2A and 2B are block diagrams illustrating a detailed configuration of an eNB 260 and a UE 202 in which systems and methods for low latency radio communications may be implemented. In FIG. 2A, the eNB 260 may include a higher layer processor 223a a DL transmitter 225 and a UL receiver 239. The higher layer processor 223a may communicate with the DL transmitter 225, UL receiver 239 and subsystems of each.

The DL transmitter 225 may include a PDCCH transmitter 227, a PDSCH transmitter 233, an SPDCCH transmitter 229 and an SPDSCH transmitter 231. The DL transmitter 225 may transmit signals/channels to a UE 202 using a transmission antenna 235a.

The UL receiver 239 may include a PUCCH receiver 241, a PUSCH receiver 247, an SPUCCH receiver 243 and an SPUSCH receiver 245. The UL receiver 239 may receive signals/channels from the UE 202 using a receiving antenna 237a.

The eNB 260 may configure, in a UE 202, shortened TTI for a serving cell. The configurations may be performed by the higher layer processor 223a. Upon the configuration, the eNB 260 may use the normal TTI and the shortened TTI for communication with the UE 202. More specifically, a HARQ process for the normal TTI based transmission and a HARQ process for the shortened TTI based transmission may run simultaneously on the serving cell for both DL and UL. If the normal TTI based and shortened based TTI DL transmissions occur in the same subframe, the eNB 260 may transmit both or drop either one. If the normal TTI based and shortened based TTI UL receptions occur in the same subframe, the eNB 260 may receive both or drop either one.

In FIG. 2B, the UE 202 may include a higher layer processor 223b a DL (SL) receiver 249 and a UL (SL) transmitter 263. The higher layer processor 223b may communicate with the DL (SL) receiver 249, UL (SL) transmitter 259 and subsystems of each.

The DL (SL) receiver 249 may include a PDCCH receiver 251, a PDSCH receiver 257, an SPDCCH receiver 253 and an SPDSCH receiver 255. The DL (SL) receiver 249 may receive signals/channels from the eNB 260 using a receiving antenna 237b.

The UL (SL) transmitter 259 may include a PUCCH transmitter 261, a PUSCH transmitter 267, an SPUCCH transmitter 263 and an SPUSCH transmitter 265. The UL (SL) transmitter 259 may send signals/channels to the eNB 260 using a transmission antenna 235b.

The UE 202 may configure the shortened TTI for a serving cell on the basis of a message from the eNB 260. The configurations may be performed by higher layer processor 223b.

Upon the configuration, the UE 202 may use the normal TTI and the shortened TTI for communication with the eNB 260. More specifically, a HARQ process for the normal TTI based transmission and a HARQ process for the shortened TTI based transmission may run simultaneously on the serving cell for both DL and UL. If the normal TTI based and shortened based TTI UL transmissions occur in the same subframe, the UE 202 may transmit both or drop either one. If the normal TTI based and shortened based TTI DL receptions occur in the same subframe, the UE 202 may receive both or drop either one.

Figure 3:
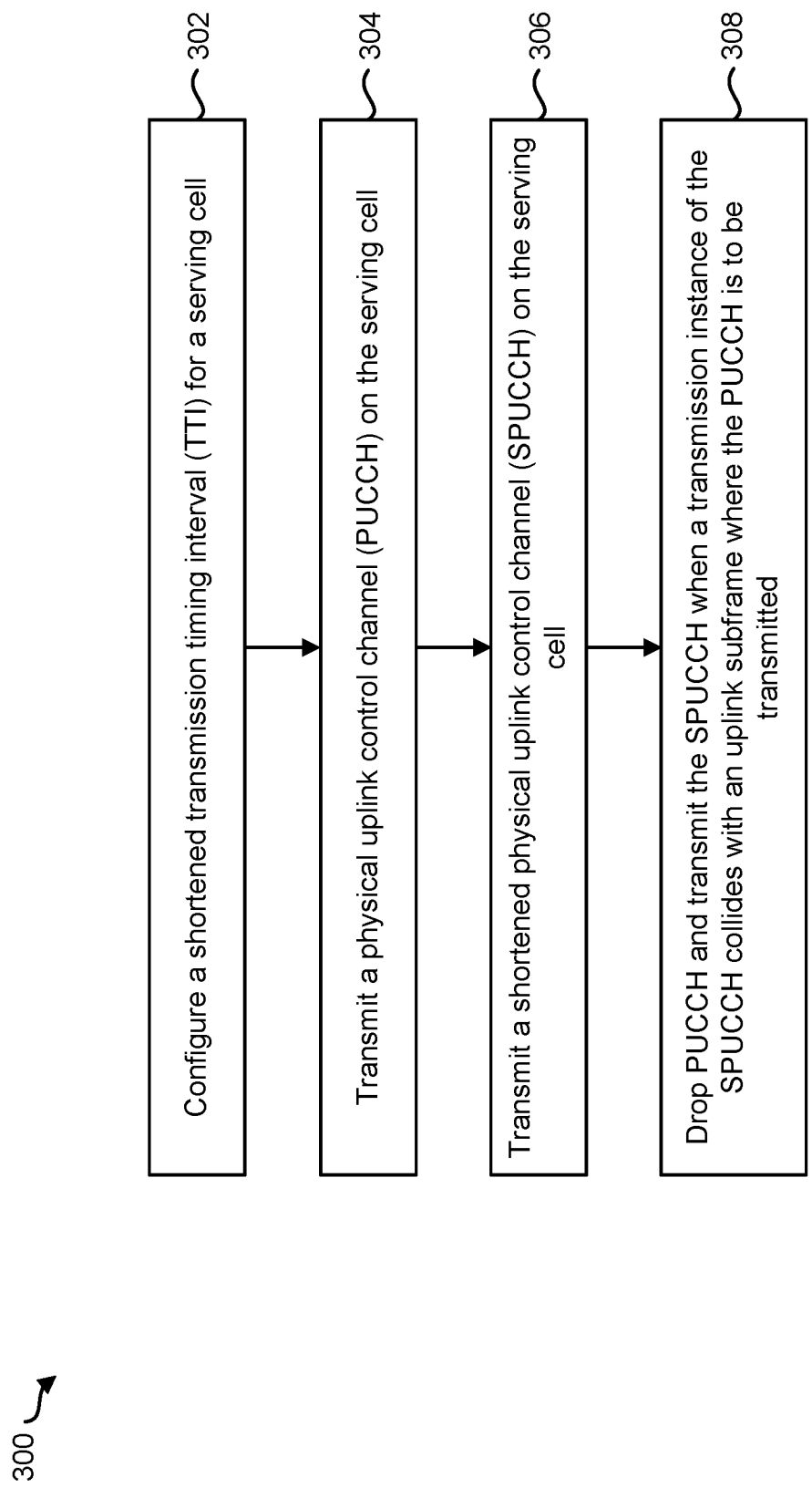
FIG. 3 is a flow diagram illustrating a method by a UE.

FIG. 3 is a flow diagram illustrating a method 300 by a UE 102. The UE 102 may communicate with one or more eNBs 160 in a wireless communication network. In one implementation, the wireless communication network may include an LTE network.

The UE 102 may configure 302 a shortened transmission timing interval (TTI) for a serving cell. For example, the UE 102 may configure 302 the shortened TTI for a serving cell on the basis of a message from the eNB 160. The configurations may be performed by higher layer processor 223b.

The UE 102 may transmit 304 a physical uplink control channel (PUCCH) on the serving cell. The UE 102 may also transmit 306 a shortened physical uplink control channel (SPUCCH) on the serving cell. A HARQ process for the normal TTI based transmission and a HARQ process for the shortened TTI based transmission may run simultaneously on the serving cell for both DL and UL.

The UE 102 may drop 308 PUCCH and transmit the SPUCCH when a transmission instance of the SPUCCH collides with an uplink subframe where the PUCCH is to be transmitted. For example, if the normal TTI based and shortened TTI based UL transmissions occur in the same subframe, the UE 202 may drop the normal TTI based UL transmission (e.g., the PUCCH) and transmits the shortened TTI based UL transmission (e.g., the SPUCCH).

Figure 4:
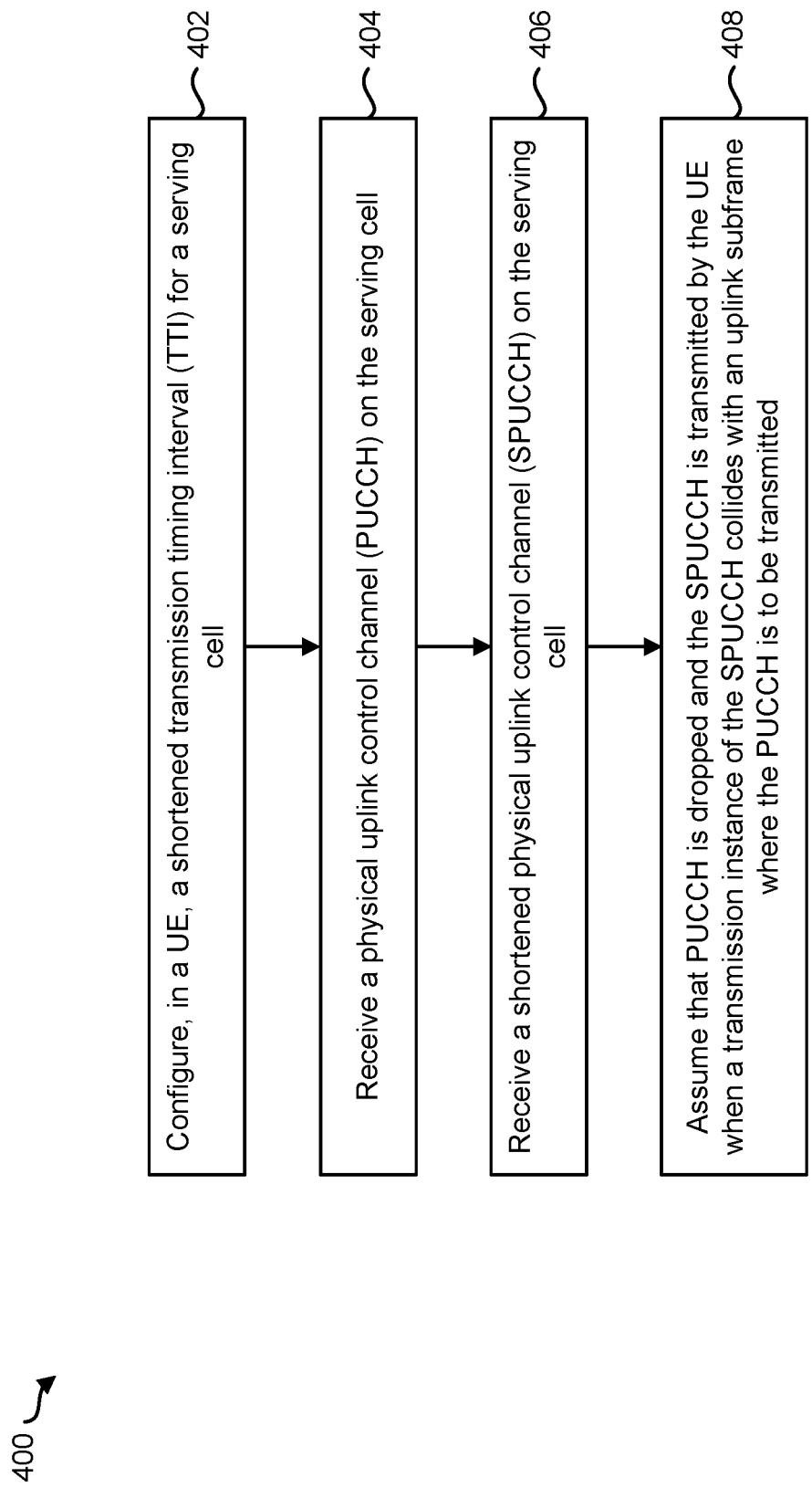
FIG. 4 is a flow diagram illustrating a method by an eNB.

FIG. 4 is a flow diagram illustrating a method 400 by an eNB 160. The eNB 160 may communicate with one or more UEs 102 in a wireless communication network. In one implementation, the wireless communication network may include an LTE network.

The eNB 160 may configure 402, in a UE 102, a shortened transmission timing interval (TTI) for a serving cell. For example, the eNB 160 may configure 402 the shortened TTI for a serving cell on the basis of a message sent to the UE 102. The configurations may be performed by higher layer processor 223a.

The eNB 160 may receive 404 a physical uplink control channel (PUCCH) on the serving cell. The eNB 160 may also receive 406 a shortened physical uplink control channel (SPUCCH) on the serving cell. A HARQ process for the normal TTI based transmission and a HARQ process for the shortened TTI based transmission may run simultaneously on the serving cell for both DL and UL.

The eNB 160 may assume 408 that PUCCH is dropped and the SPUCCH is transmitted by the UE 102 when a transmission instance of the SPUCCH collides with an uplink subframe where the PUCCH is to be transmitted. For example, if the normal TTI based and shortened TTI based UL transmissions occur in the same subframe, the UE 202 may drop the normal TTI based UL transmission (e.g., the PUCCH) and transmits the shortened TTI based UL transmission (e.g., the SPUCCH).

Figure 5:
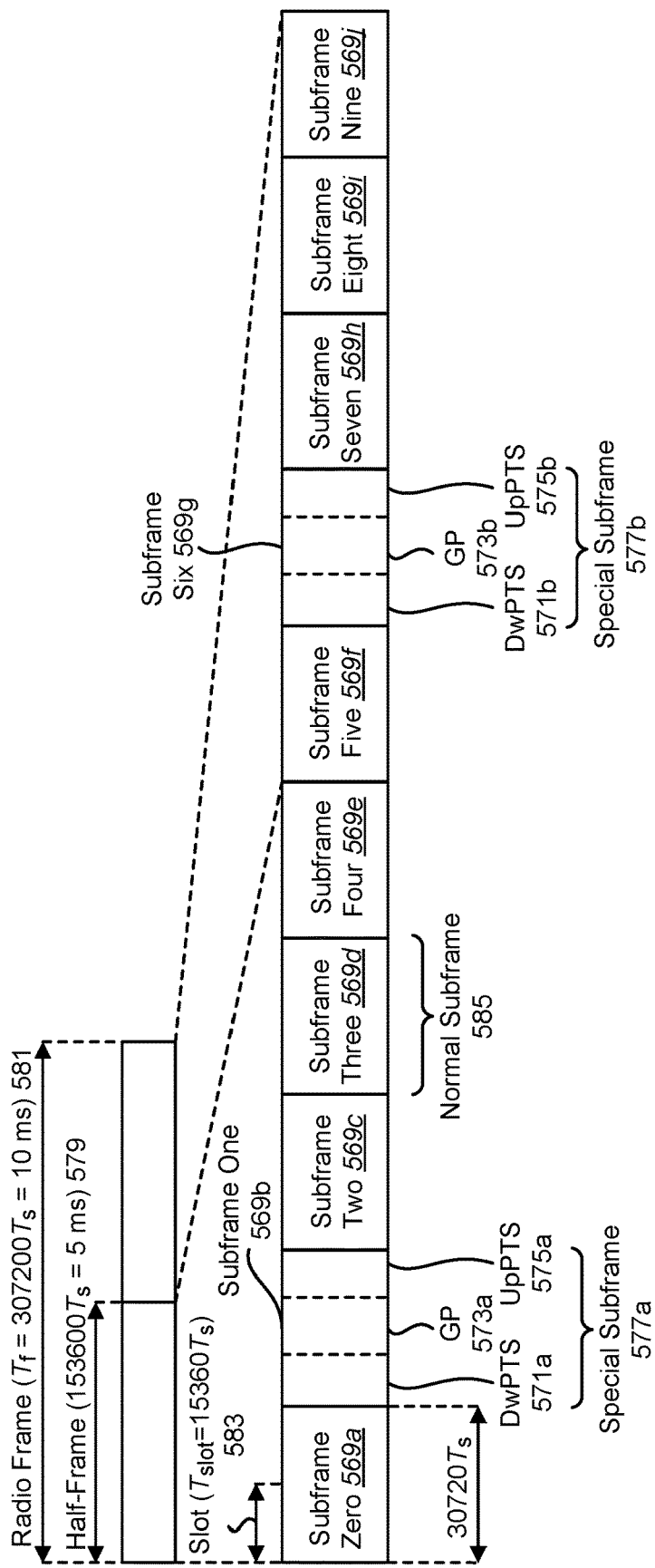
FIG. 5 is a diagram illustrating one example of a radio frame that may be used in accordance with the systems and methods disclosed herein.

FIG. 5 is a diagram illustrating one example of a radio frame 581 that may be used in accordance with the systems and methods disclosed herein. This radio frame 581 structure illustrates a TDD structure. Each radio frame 581 may have a length of $T_f=307200 \cdot T_s=10$ ms, where $T_f$ is a radio frame 581 duration and $T_s$ is a time unit equal to $$\frac{1}{(15000 \times 2048)}$$

seconds. The radio frame 581 may include two half-frames 579, each having a length of $153600 \cdot T_s=5$ ms. Each half-frame 579 may include five subframes 569a-e, 569f-j each having a length of $30720 \cdot T_s=1$ ms. Each subframe 569 may include two slots 583 each having a length of $15360 \cdot T_s=1/2$ ms.

TDD UL/DL configurations 0-6 are given below in Table 9 (from Table 4.2-2 in 3GPP TS 36.211). UL/DL configurations with both 5 millisecond (ms) and 10 ms downlink-to-uplink switch-point periodicity may be supported. In particular, seven UL/DL configurations are specified in 3GPP specifications, as shown in Table 9 below. In Table 9, "D" denotes a downlink subframe, "S" denotes a special subframe and "U" denotes a UL subframe.

TABLE 9

| TDD UL/DL Configuration Number | Downlink-to-Uplink Switch-Point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 9 above, for each subframe in a radio frame, "D" indicates that the subframe is reserved for downlink transmissions, "U" indicates that the subframe is reserved for uplink transmissions and "S" indicates a special subframe with three fields: a downlink pilot time slot (DwPTS), a guard period (GP) and an uplink pilot time slot (UpPTS). The length of DwPTS and UpPTS is given in Table 10 (from Table 4.2-1 of 3GPP TS 36.211) subject to the total length of DwPTS, GP and UpPTS being equal to $30720 \cdot T_s=1$ ms. In Table 10, "cyclic prefix" is abbreviated as "CP" and "configuration" is abbreviated as "Config" for convenience.

TABLE 10

| Special Subframe Config | Normal CP in downlink | | | Extended CP in downlink | | |
|---|---|---|---|---|---|---|
| | DwPTS | UpPTS | | DwPTS | UpPTS | |
| | | Normal CP in uplink | Extended CP in uplink | | Normal CP in uplink | Extended CP in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

UL/DL configurations with both 5 ms and 10 ms downlink-to-uplink switch-point periodicity are supported. In the case of 5 ms downlink-to-uplink switch-point periodicity, the special subframe exists in both half-frames. In the case of 10 ms downlink-to-uplink switch-point periodicity, the special subframe exists in the first half-frame only. Subframes 0 and 5 and DwPTS may be reserved for downlink transmission. UpPTS and the subframe immediately following the special subframe may be reserved for uplink transmission.

In accordance with the systems and methods disclosed herein, some types of subframes 569 that may be used include a downlink subframe, an uplink subframe and a special subframe 577. In the example illustrated in FIG. 5, which has a 5 ms periodicity, two standard special subframes 577a-b are included in the radio frame 581. The remaining subframes 569 are normal subframes 585.

The first special subframe 577a includes a downlink pilot time slot (DwPTS) 571a, a guard period (GP) 573a and an uplink pilot time slot (UpPTS) 575a. In this example, the first standard special subframe 577a is included in subframe one 569b. The second standard special subframe 577b includes a downlink pilot time slot (DwPTS) 571b, a guard period (GP) 573b and an uplink pilot time slot (UpPTS) 575b. In this example, the second standard special subframe 577b is included in subframe six 569g. The length of the DwPTS 571a-b and UpPTS 575a-b may be given by Table 4.2-1 of 3GPP TS 36.211 (illustrated in Table 10 above) subject to the total length of each set of DwPTS 571, GP 573 and UpPTS 575 being equal to $30720 \cdot T_s = 1$ ms.

Each subframe i 569a-j (where i denotes a subframe ranging from subframe zero 569a (e.g., 0) to subframe nine 569j (e.g., 9) in this example) is defined as two slots, 2i and 2i+1 of length $T_{slot} = 15360 \cdot T_s = 0.5$ ms in each subframe 569. For example, subframe zero (e.g., 0) 569a may include two slots, including a first slot.

UL/DL configurations with both 5 ms and 10 ms downlink-to-uplink switch-point periodicity may be used in accordance with the systems and methods disclosed herein. FIG. 5 illustrates one example of a radio frame 581 with 5 ms switch-point periodicity. In the case of 5 ms downlink-to-uplink switch-point periodicity, each half-frame 579 includes a standard special subframe 577a-b. In the case of 10 ms downlink-to-uplink switch-point periodicity, a special subframe 577 may exist in the first half-frame 579 only.

Subframe zero (e.g., 0) 569a and subframe five (e.g., 5) 569f and DwPTS 571a-b may be reserved for downlink transmission. The UpPTS 575a-b and the subframe(s) immediately following the special subframe(s) 577a-b (e.g., subframe two 569c and subframe seven 569h) may be reserved for uplink transmission. It should be noted that, in some implementations, special subframes 577 may be considered DL subframes in order to determine a set of DL subframe associations that indicate UCI transmission uplink subframes of a UCI transmission cell.

LTE license access with TDD can have the special subframe as well as the normal subframe. The lengths of DwPTS, GP and UpPTS can be configured by using a special subframe configuration. Any one of the following ten configurations may be set as a special subframe configuration.

1) Special subframe configuration 0: DwPTS consists of 3 OFDM symbols. UpPTS consists of 1 single carrier frequency-division multiple access (SC-FDMA) symbol.

2) Special subframe configuration 1: DwPTS consists of 9 OFDM symbols for normal CP and 8 OFDM symbols for extended CP. UpPTS consists of 1 SC-FDMA symbol.

3) Special subframe configuration 2: DwPTS consists of 10 OFDM symbols for normal CP and 9 OFDM symbols for extended CP. UpPTS consists of 1 SC-FDMA symbol.

4) Special subframe configuration 3: DwPTS consists of 11 OFDM symbols for normal CP and 10 OFDM symbols for extended CP. UpPTS consists of 1 SC-FDMA symbol.

5) Special subframe configuration 4: DwPTS consists of 12 OFDM symbols for normal CP and 3 OFDM symbols for extended CP. UpPTS consists of 1 SC-FDMA symbol for normal CP and 2 SC-FDMA symbol for extended CP.

6) Special subframe configuration 5: DwPTS consists of 3 OFDM symbols for normal CP and 8 OFDM symbols for extended CP. UpPTS consists of 2 SC-FDMA symbols.

7) Special subframe configuration 6: DwPTS consists of 9 OFDM symbols. UpPTS consists of 2 SC-FDMA symbols.

8) Special subframe configuration 7: DwPTS consists of 10 OFDM symbols for normal CP and 5 OFDM symbols for extended CP. UpPTS consists of 2 SC-FDMA symbols.

9) Special subframe configuration 8: DwPTS consists of 11 OFDM symbols. UpPTS consists of 2 SC-FDMA symbols. Special subframe configuration 8 can be configured only for normal CP 10) Special subframe configuration 9: DwPTS consists of 6 OFDM symbols. UpPTS consists of 2 SC-FDMA symbols. Special subframe configuration 9 can be configured only for normal CP.

Figure 6:
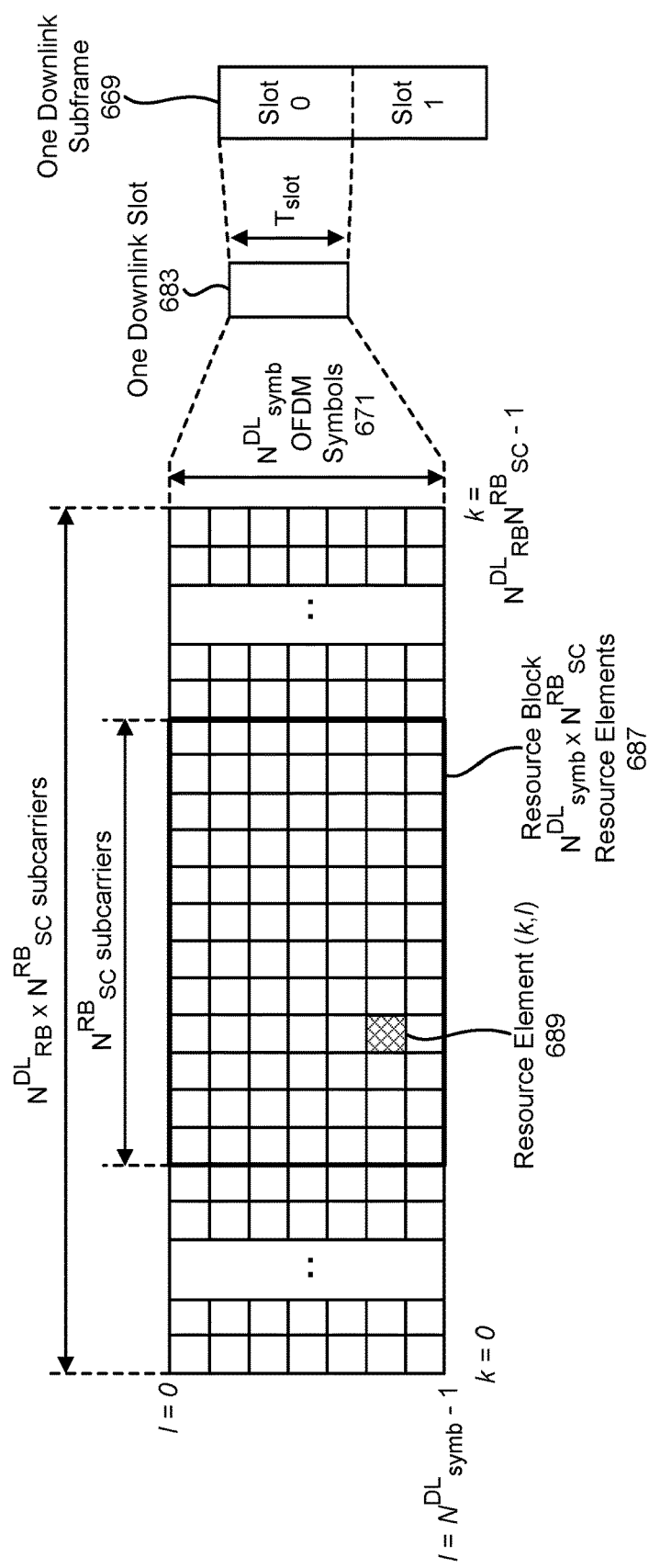
FIG. 6 is a diagram illustrating one example of a resource grid.

FIG. 6 is a diagram illustrating one example of a resource grid. The resource grid illustrated in FIG. 6 may be utilized in some implementations of the systems and methods disclosed herein. More detail regarding the resource grid is given in connection with FIG. 1.

In FIG. 6, one downlink subframe 669 may include two downlink slots 683. $N^{DL}_{RB}$ is downlink bandwidth configuration of the serving cell, expressed in multiples of $N^{RB}_{sc}$, where $N^{RB}_{sc}$ is a resource block 687 size in the frequency domain expressed as a number of subcarriers, and $N^{DL}_{symb}$ is the number of OFDM symbols 1085 in a downlink slot 683. A resource block 687 may include a number of resource elements (RE) 689.

For a PCell, $N^{DL}_{RB}$ is broadcast as a part of system information. For an SCell (including an LAA SCell), $N^{DL}_{RB}$ is configured by a RRC message dedicated to a UE 102. For PDSCH mapping, the available RE 689 may be the RE 689 whose index l fulfils l≥$l_{data,start}$ and/or $l_{data,end}$≥l in a subframe.

Figure 7:
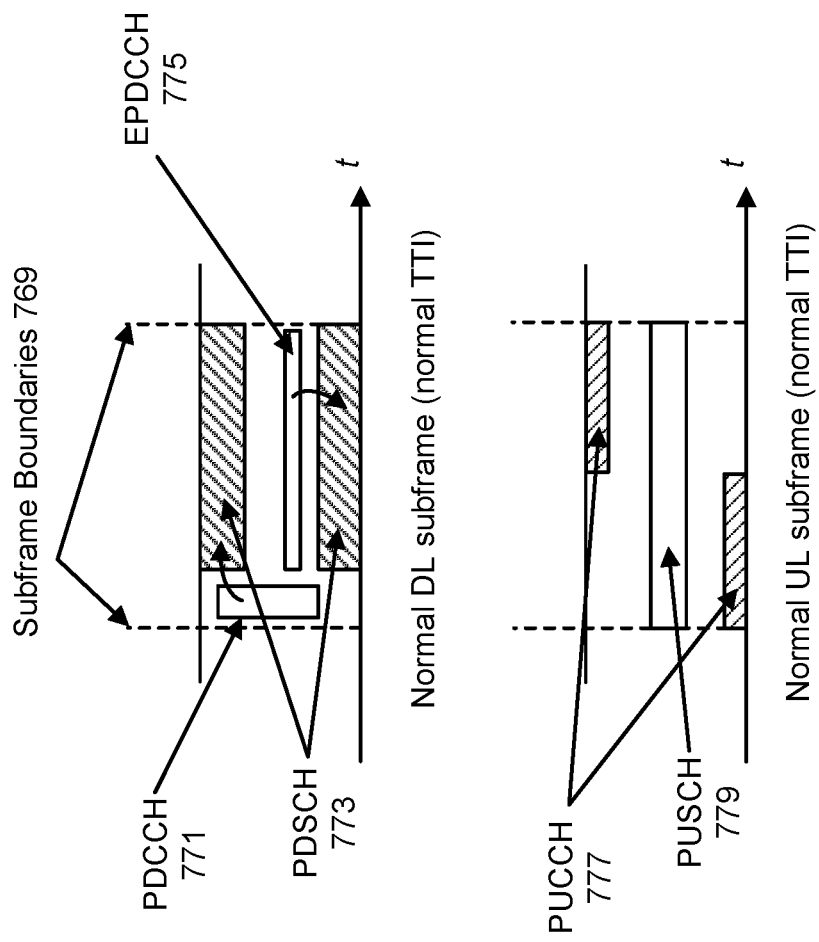
FIG. 7 illustrates an example of a physical channel structure for a normal transmission time interval (TTI)

FIG. 7 illustrates an example of a physical channel structure for a normal TTI. In an implementation, the TTI duration on an SCell may be defined by subframe boundaries 769 in the time domain. For downlink, PDCCH 771 is a physical downlink control channel mapped on the OFDM symbols that are located in the front part (e.g., the first OFDM symbol through the 4th OFDM symbol) of a subframe. EPDCCH 775 is another physical downlink control channel mapped on the OFDM symbols that are located in rear part (e.g., the 2nd OFDM symbol to the last OFDM symbol) of the subframe.

The PDCCH 771 or EPDCCH 775 may carry a downlink assignment that indicates a PDSCH 773 transmission. The PDSCH 773 may be mapped on the OFDM symbols that are located in the rear part (e.g., the 2nd OFDM symbol to the last OFDM symbol) of the subframe.

For uplink, PUCCH 777 is a physical uplink control channel mapped on the whole SC-FDMA symbols within a subframe but is mapped to different frequency resources in different slots of the subframe. PUSCH 779 is a physical uplink shared channel mapped on the whole SC-FDMA symbols within the subframe and is mapped to the resources that are relatively closer to the center frequency of the uplink system band than those for PUCCH 777.

Figure 8:
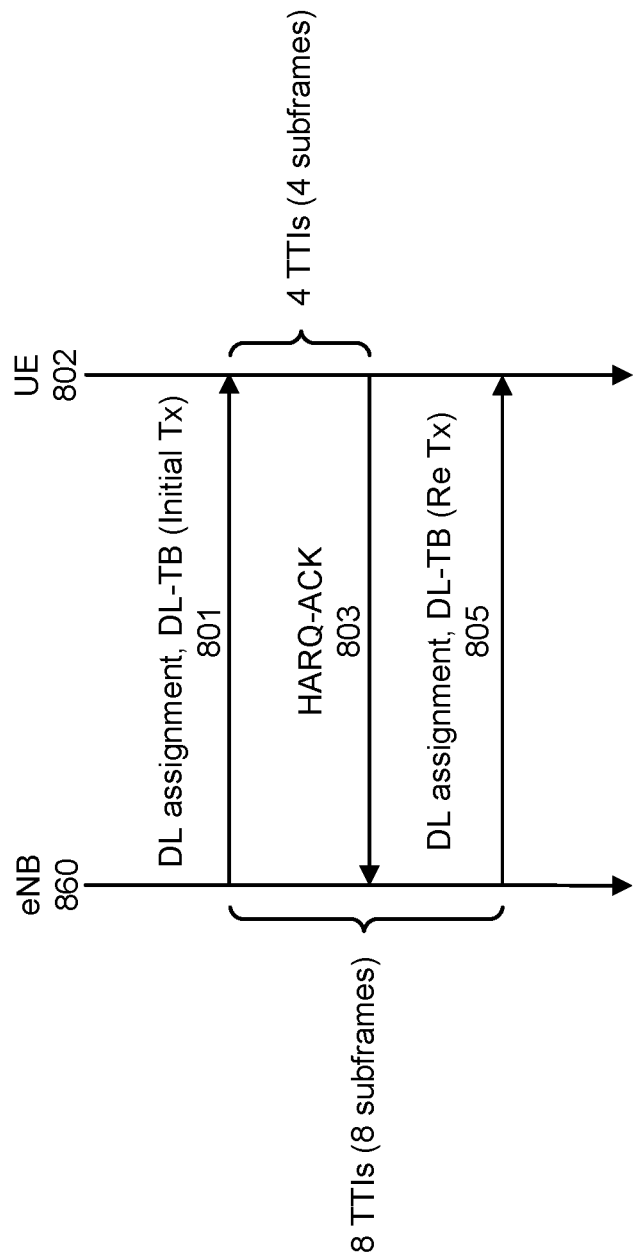
FIG. 8 illustrates an example of a retransmission cycle of a downlink (DL) transport block (DL-TB)

FIG. 8 illustrates an example of a retransmission cycle of a DL transport block (DL-TB). When data transmission occurs in a higher layer at the eNB side, the eNB 860 may determine physical layer parameters (e.g., MCS, PRB assignment, etc.) for an initial transmission of the DL-TB. The eNB 860 may transmit 801 a DL assignment and the corresponding PDSCH 773 carrying the DL-TB(s) in the same subframe.

If the UE 802 detects PDCCH 771 or EPDCCH 775 carrying the DL assignment, the UE 802 may attempt to decode DL-TB in the corresponding PDSCH 773. If the UE 802 succeeds to decode DL-TB, then the UE 802 may report 803 ACK as the HARQ-ACK in the subframe 4-TTI later than the subframe carrying the DL assignment and DL-TB. Otherwise, the UE 802 reports 803 NACK as the HARQ-ACK in that subframe.

When the eNB 860 receives NACK, the eNB 860 retransmits 805 the DL-TB in the subframe 4-TTI later than the subframe carrying HARQ-ACK. Similarly, the next retransmission may be performed in the subframe 8-TTI later than the subframe of the 1st retransmission. Eventually, the retransmission cycle is 8 TTIs. In other words, a given DL-TB may be transmitted in every 8 subframe at minimum as long as the UE 802 reports NACK for the DL-TB.

Figure 9:
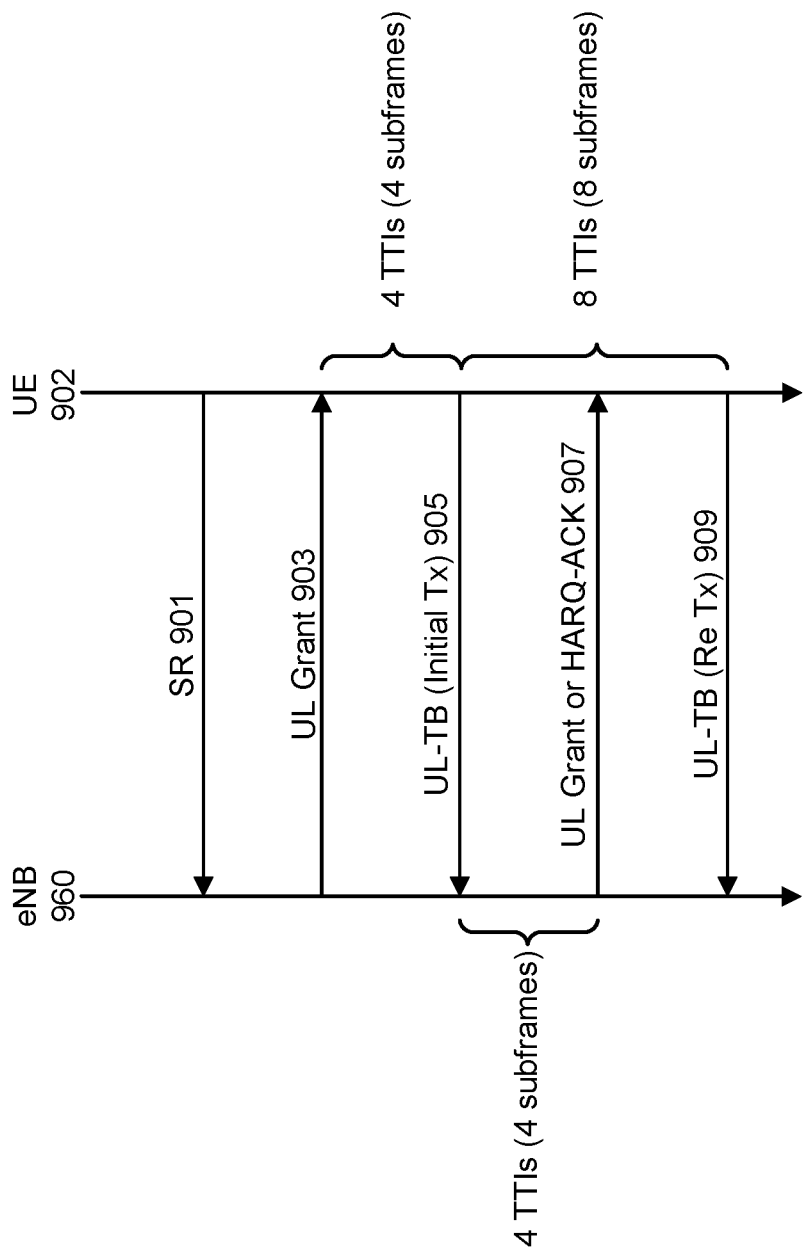
FIG. 9 illustrates an example of a retransmission cycle of a UL transport block (UL-TB)

FIG. 9 illustrates an example of a retransmission cycle of a UL transport block (UL-TB). When data transmission occurs in a higher layer at the UE side, the UE 902 may send 901 a scheduling request (SR) or may initiate a random access channel (RACH) procedure instead of sending the SR.

If the eNB 960 receives the SR or finished the RACH procedure, the eNB 960 may determine physical layer parameters (e.g., MCS, PRB assignment, etc.) for an initial transmission of the UL-TB. The eNB 960 may transmit 903 an UL grant.

If the UE 902 detects PDCCH 771 or EPDCCH 775 carrying the UL grant, the UE 902 may transmit 905 PUSCH 779 containing the UL-TB in the subframe 4-TTI later than the subframe carrying the UL grant. The eNB 960 may attempt to decode the UL-TB.

If the UE 902 succeeds to decode DL-TB, then the eNB 960 may report 907 ACK as the HARQ-ACK or may send another UL grant scheduling a new UL-TB in the subframe 4-TTI later than the subframe carrying the UL-TB. Otherwise, the eNB 960 may report NACK as the HARQ-ACK or may send another UL grant scheduling the same UL-TB in that subframe.

When the UE 902 receives NACK or another UL grant scheduling the same UL-TB, the UE 902 may re-transmit 909 the UL-TB in the subframe 4-TTI later than the subframe carrying HARQ-ACK or the UL grant. Similarly, the next retransmission may be performed in the subframe 8-TTI later than the subframe of the 1st retransmission. Eventually, the retransmission cycle is 8 TTIs. In other words, a given UL-TB may be transmitted in every 8 subframe at minimum as long as the eNB 960 reports NACK or sends an UL grant initiating a retransmission for the UL-TB.

Figure 10:
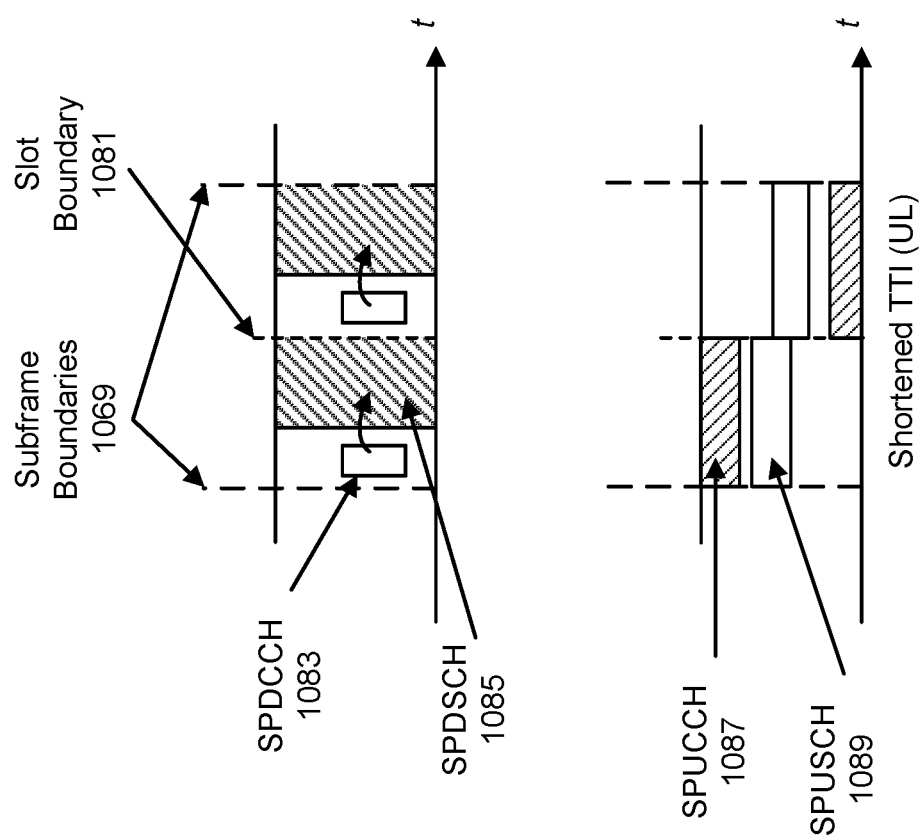
FIG. 10 illustrates an example of a physical channel structure for a shortened TTI.

FIG. 10 illustrates an example of a physical channel structure for a shortened TTI. In an implementation, the TTI duration on an SCell may be defined by 1-slot length in the time domain. The subframe boundaries 1069 and slot boundary 1081 for a subframe are shown.

For downlink, SPDCCH 1083 is a physical downlink control channel mapped within leading one or several OFDM symbols in a slot. The SPDCCH 1083 may carry a downlink assignment which indicates a SPDSCH 1085 transmission. The SPDSCH 1085 may be mapped on the OFDM symbols which starts the 2nd to 4th OFDM symbol and ends the last OFDM symbol in the slot.

For uplink, SPUCCH 1087 is a physical uplink control channel mapped within a slot. SPUSCH 1089 is a physical uplink shared channel mapped within the slot. With these structures, TTI length becomes shorter than the normal TTI.

Figure 11:
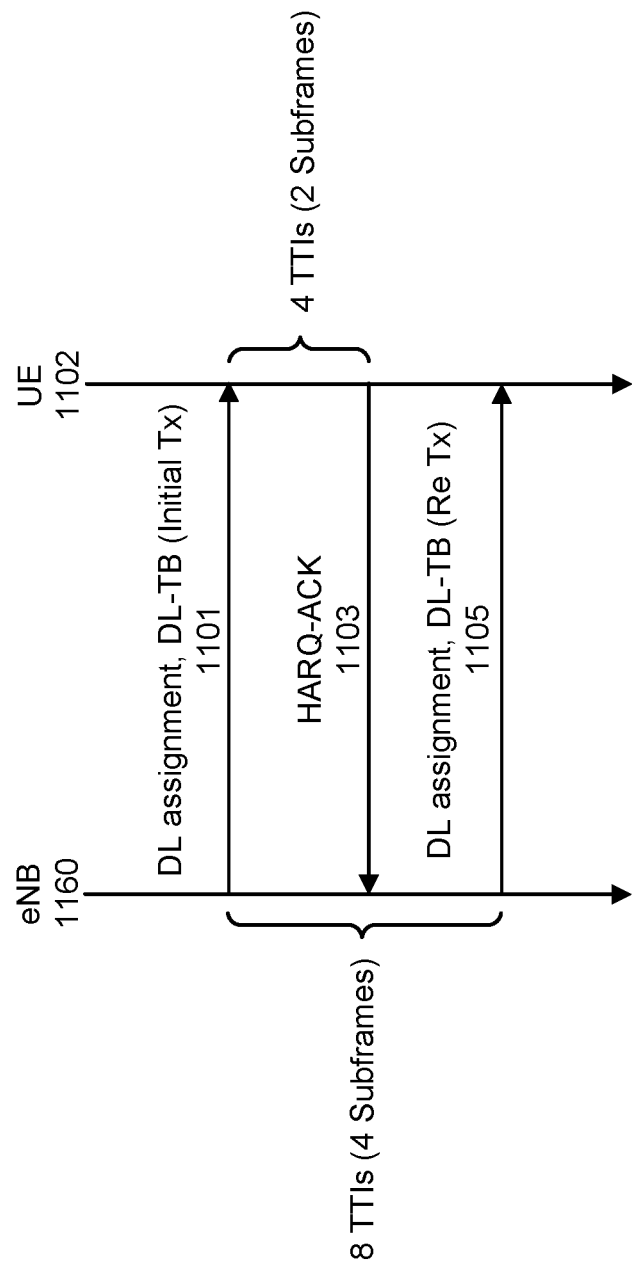
FIG. 11 illustrates an example of a retransmission cycle of a DL-TB in the case of a shortened TTI.

FIG. 11 illustrates an example of a retransmission cycle of a DL-TB in the case of a shortened TTI. For example, the TTI may be a 1-slot-long TTI. When data transmission occurs in a higher layer at the eNB side, the eNB 1160 may determine physical layer parameters for an initial transmission of the DL-TB. The eNB 1160 may transmit 1101 SPDCCH 1083 carrying DL assignment and the corresponding SPDSCH 1085 carrying the DL-TB(s) in the same TTI.

If the UE 1102 detects SPDCCH 1083 carrying the DL assignment, the UE 1102 may attempt to decode DL-TB in the corresponding SPDSCH 1085. If the UE 1102 succeeds to decode DL-TB, then the UE 1102 may report 1103 ACK as the HARQ-ACK in the TTI that is 4-TTI later than the TTI carrying the DL assignment and DL-TB. Otherwise, the UE 1102 may report 1103 NACK as the HARQ-ACK in that TTI.

When the eNB 1160 receives NACK, the eNB 1160 may re-transmit 1105 the DL-TB in the TTI that is 4-TTI later than the TTI carrying HARQ-ACK. Similarly, the next retransmission may be performed in the 8-TTI later TTI than the TTI of the 1st retransmission.

Eventually, the retransmission cycle is 8 TTIs, which is equal to 4 subframes (e.g., 4 ms) for the 1-slot-long TTI. In other words, a given DL-TB may be transmitted in every 4 subframes at minimum as long as the UE 1102 reports NACK for the DL-TB. The latency in the physical layer becomes much shorter than the normal TTI.

Figure 12:
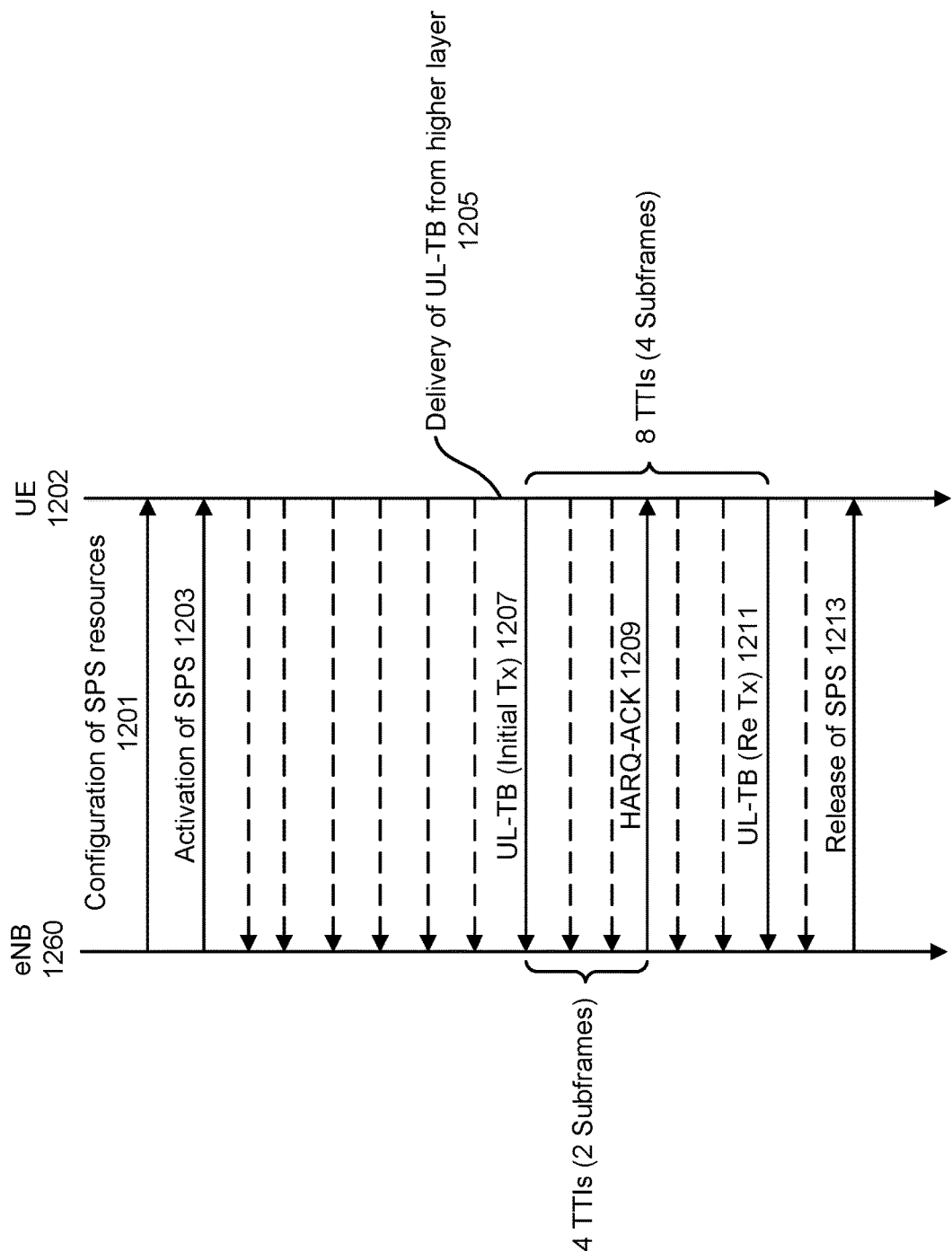
FIG. 12 illustrates another example of a retransmission cycle of a UL-TB in the case of a shortened TTI.

FIG. 12 illustrates another example of a retransmission cycle of a UL-TB in the case of a shortened TTI. For example, the TTI may be a 1-slot-long TTI. This example is based on a UL semi-persistent scheduling (SPS)-based UL transmission. The eNB 1260 may first configure 1201 SPS resources for the UE 1202 using a dedicated RRC message and then the eNB 1260 activates 1203 SPS.

Once the SPS for the UE 1202 is activated, periodic resources are reserved for the UE 1202 (or a UE group including the UE 1202). As long as the UE 1202 does not have any data to transmit, the UE 1202 does not use the periodic resources.

When a transmission of data occurs in a higher layer at the UE side, the UE 1202 may perform an initial transmission of the UL-TB though one of the periodic resources (e.g., the immediately coming resource after the data occasion). A higher layer of the UE 1202 may deliver 1205 the UL-TB. The UE 1202 may transmit 1207 the UL-TB to the eNB 1260. The UE 1202 may transmit SPUSCH 1089 carrying the UL-TB(s) in the TTI including that resource. Alternatively, the UE 1202 may transmit SPUCCH 1087 carrying UL assignment, which indicates PUSCH 779 parameter (e.g., MCS, HARQ process number, redundancy version, etc.), and the corresponding SPUSCH 1089 carrying the UL-TB(s) in that TTI.

Once the eNB 1260 has activated SPS, the eNB 1260 may keep monitoring the corresponding periodic resources. In other words, the eNB 1260 may attempt to detect UL-TB in the SPUSCH 1089 in every activated SPS resource. If the eNB 1260 succeeds to decode UL-TB, then the eNB 1260 may report 1209 ACK as the HARQ-ACK in the TTI that is 4-TTI later than the TTI carrying the UL assignment and UL-TB. Otherwise, the eNB 1260 may report 1209 NACK as the HARQ-ACK in that TTI.

When the UE 1202 receives NACK, the UE 1202 may re-transmit 1211 the UL-TB in the TTI that is 4-TTI or more later than the TTI carrying HARQ-ACK. Alternatively, the eNB 1260 may send 1209 only ACK via SPDCCH 1083 but may never send NACK for the UL SPS-based SPUSCH 1089. In this case, the UE 1202 may automatically re-transmit the UL-TB(s) in that TTI. Similarly, the next retransmission may be performed in the 8-TTI later TTI than the TTI of the 1st retransmission.

Eventually, the minimum retransmission cycle is 8 TTIs, which is equal to 4 subframes for the 1-slot-long TTI. In other words, a given UL-TB may be transmitted in every 4 subframes at minimum as long as the eNB 1260 reports NACK for the UL-TB. The latency in the physical layer becomes much shorter than the normal TTI.

If the eNB 1260 thinks that all possible UL transmissions have been done, the eNB 1260 may release 1213 SPS. After that, the UE 1202 may not be allowed to use the configured SPS resources and the eNB 1260 may not have to monitor those resources any more.

FIG. 13 illustrates an example of a collision of PUCCH 1377 with SPUCCH 1387. In FIG. 13, DL subframes 1391 and uplink subframes 1393 are shown.

In a serving cell, an eNB 160 may transmit a normal PDSCH 1373 and a SPDSCH 1385 for a single UE 102. Even if the UE 102 receives the normal PDSCH 1373 and the SPDSCH 1385 in different subframes, transmission timing of PUCCH 1377 corresponding to the PDSCH 1373 may collide with transmission timing of SPUCCH 1387 corresponding to the SPDSCH 1385. To be more specific, the UE 102 receiving PDSCH 1373 in subframe n−4 may have to transmit PUCCH 1377 in subframe n. The UE 102 may also receive SPDSCH 1385 between subframe n−4 and subframe n, and the transmission timing for SPUCCH 1387 corresponding to the SPDSCH 1385 may be subframe n.

FIG. 14 illustrates an example of a collision of SPUCCH 1487 with semi-statically-scheduled PUCCH 1477 resources. In FIG. 14, DL subframes 1491 and uplink subframes 1493 are shown.

A UE 102 configured with periodic CSI reporting may have to transmit PUCCH 1477 in every m subframe. The UE 102 may receive SPDSCH 1485, and the transmission timing for SPUCCH 1487 corresponding to the SPDSCH 1485 may be the same subframe as for the periodic CSI reporting.

In another example, the UE 102 may be configured with PUCCH 1477 resources for Scheduling Request (SR) transmission. The UE 102 may receive SPDSCH 1485, and the transmission timing for SPUCCH 1487 corresponding to the SPDSCH 1485 may be the same subframe as for PUCCH 1477 transmission carrying the SR. SPUCCH 1487 and SPUSCH 1089 might not support UCI transmission (e.g. CSI including RI, PMI and CQI, and SR) other than HARQ-ACK.

FIG. 15 illustrates an example of a collision of semi-persistently scheduled SPUSCH 1589 resources with PUCCH 1577 resources. In FIG. 15, DL subframes 1591 and uplink subframes 1593 are shown.

A UE 102 may receive PDSCH 1573, and the transmission timing for PUCCH 1577 corresponding to the PDSCH 1573 may be the same subframe as for the SPUSCH 1589 transmission. For another example, the UE 102 configured with semi-persistently scheduled SPUSCH 1589 resources may transmit SPUSCH 1589 in one of the resources. The UE 102 may receive (E)PDCCH carrying an UL grant, and the transmission timing for PUSCH corresponding to the (E)PDCCH may be the same subframe as for the SPUSCH 1589 transmission.

Figure 16:
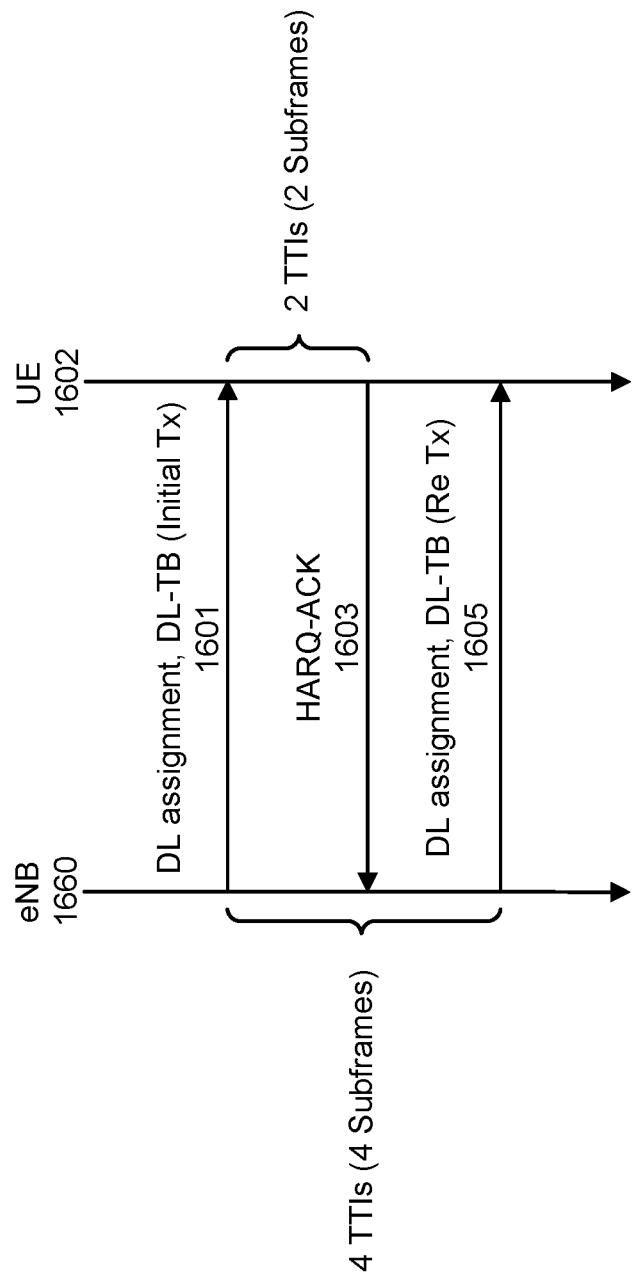
FIG. 16 illustrates an example of a retransmission cycle of a DL-TB with a shortened Round Trip Time (RTT)

FIG. 16 illustrates an example of a retransmission cycle of a DL-TB with a shortened Round Trip Time (RTT). When data transmission occurs in a higher layer at the eNB side, the eNB 1660 may determine physical layer parameters for an initial transmission of the DL-TB. The eNB 1660 may transmit 1601 a DL assignment and the corresponding PDSCH 773 carrying the DL-TB(s) in the same subframe.

If the UE 1602 detects the PDCCH 771 or EPDCCH 775 carrying the DL assignment, the UE 1602 may attempt to decode DL-TB in the corresponding PDSCH 773. If the UE 1602 succeeds to decode DL-TB, then the UE 1602 may report 1603 ACK as the HARQ-ACK in the subframe 2-TTI later than the subframe carrying the DL assignment and DL-TB. Otherwise, the UE 1602 may report 1603 NACK as the HARQ-ACK in that subframe.

When the eNB 1660 receives NACK, the eNB 1660 may re-transmit 1605 the DL-TB in the subframe 2-TTI later than the subframe carrying HARQ-ACK. Similarly, the next retransmission may be performed in the subframe 4-TTI later than the subframe of the 1st retransmission.

Eventually, the retransmission cycle is 4 TTIs. In other words, a given DL-TB may be transmitted in every 4 subframe at minimum as long as the UE 1602 reports NACK for the DL-TB.

Figure 17:
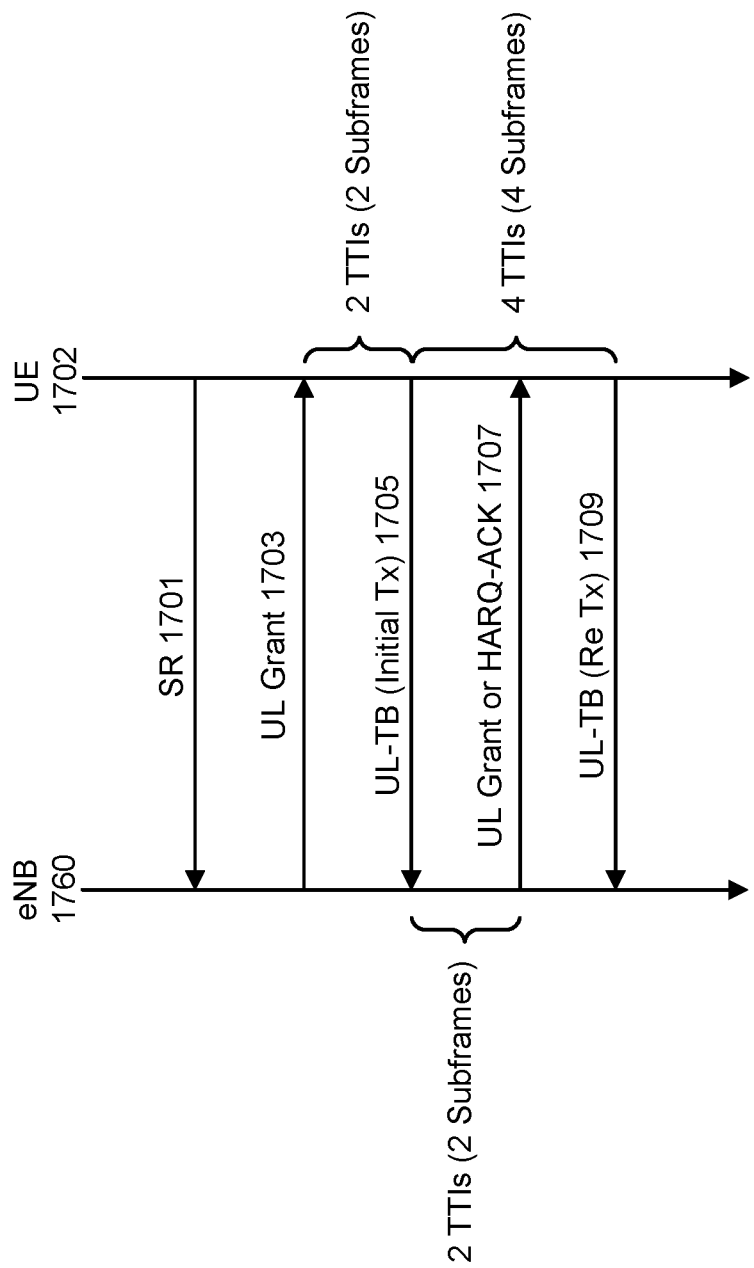
FIG. 17 illustrates an example of a retransmission cycle of a UL-TB with a shortened RTT.

FIG. 17 illustrates an example of a retransmission cycle of a UL-TB with a shortened RTT. When data transmission occurs in a higher layer at the UE side, the UE 1702 may send 1701 a scheduling request (SR) or may initiate a RACH procedure instead of sending SR.

If the eNB 1760 receives the SR or finished the RACH procedure, the eNB 1760 may determine physical layer parameters (e.g., MCS, PRB assignment, etc.) for an initial transmission of the UL-TB. The eNB 1760 may transmit 1703 a UL grant. If the UE 1702 detects a PDCCH 771 or EPDCCH 775 carrying the UL grant, the UE 1702 may transmit 1705 PUSCH 779 containing the UL-TB in the subframe 2-TTI later than the subframe carrying the UL grant. The eNB 1760 may attempt to decode the UL-TB.

If the eNB 1760 succeeds to decode UL-TB, then the eNB 1760 may report 1707 ACK as the HARQ-ACK or may send another UL grant scheduling a new UL-TB in the subframe 2-TTI later than the subframe carrying the UL-TB. Otherwise, the eNB 1760 may report 1707 NACK as the HARQ-ACK or may send another UL grant scheduling the same UL-TB in that subframe.

When the UE 1702 receives NACK or another UL grant scheduling the same UL-TB, the UE 1702 may re-transmit 1709 the UL-TB in the subframe 2-TTI later than the subframe carrying the HARQ-ACK or the UL grant. Similarly, the next retransmission may be performed in the subframe 4-TTI later than the subframe of the 1st retransmission.

Eventually, the retransmission cycle is 4 TTIs. In other words, a given UL-TB may be transmitted in every 4 subframe at minimum as long as the eNB 1760 reports NACK or sends a UL grant initiating a retransmission for the UL-TB.

The shortened 2-TTI interval provides a RTT of 4 TTIs, with a 2 OFDM symbol TTI, the RTT is 8 symbols. If the interval is 3 TTIs, the RTT is 6 TTIs, with a 2 OFDM symbol TTI, the RTT is 12 symbols. Both of them are under 1 ms RTT.

Figure 18:
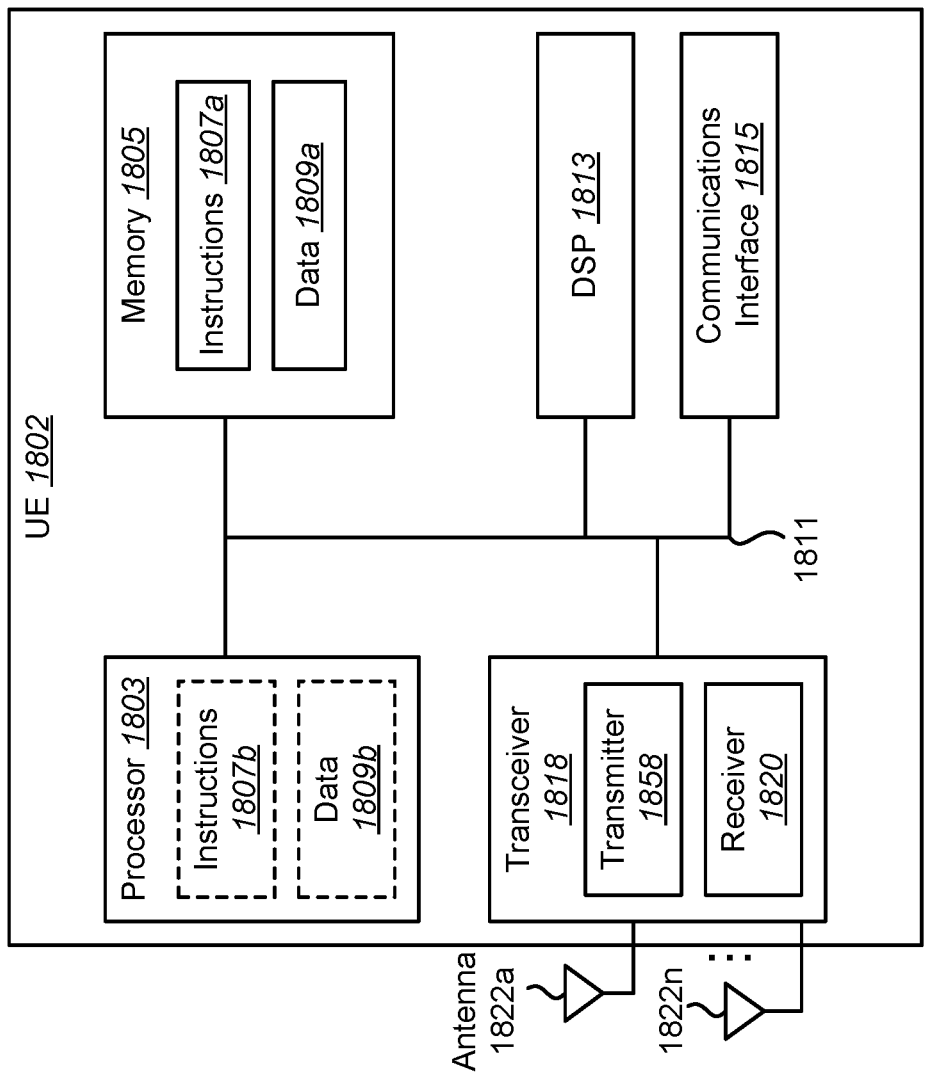
FIG. 18 illustrates various components that may be utilized in a UE.

FIG. 18 illustrates various components that may be utilized in a UE 1802. The UE 1802 described in connection with FIG. 18 may be implemented in accordance with the UE 102 described in connection with FIG. 1. The UE 1802 includes a processor 1803 that controls operation of the UE 1802. The processor 1803 may also be referred to as a central processing unit (CPU). Memory 1805, which may include read-only memory (ROM), random access memory (RAM), a combination of the two or any type of device that may store information, provides instructions 1807a and data 1809a to the processor 1803. A portion of the memory 1805 may also include non-volatile random access memory (NVRAM). Instructions 1807b and data 1809b may also reside in the processor 1803. Instructions 1807b and/or data 1809b loaded into the processor 1803 may also include instructions 1807a and/or data 1809a from memory 1805 that were loaded for execution or processing by the processor 1803. The instructions 1807b may be executed by the processor 1803 to implement the method 300 described above.

The UE 1802 may also include a housing that contains one or more transmitters 1858 and one or more receivers 1820 to allow transmission and reception of data. The transmitter(s) 1858 and receiver(s) 1820 may be combined into one or more transceivers 1818. One or more antennas 1822a-n are attached to the housing and electrically coupled to the transceiver 1818.

The various components of the UE 1802 are coupled together by a bus system 1811, which may include a power bus, a control signal bus and a status signal bus, in addition to a data bus. However, for the sake of clarity, the various buses are illustrated in FIG. 18 as the bus system 1811. The UE 1802 may also include a digital signal processor (DSP) 1813 for use in processing signals. The UE 1802 may also include a communications interface 1815 that provides user access to the functions of the UE 1802. The UE 1802 illustrated in FIG. 18 is a functional block diagram rather than a listing of specific components.

Figure 19:
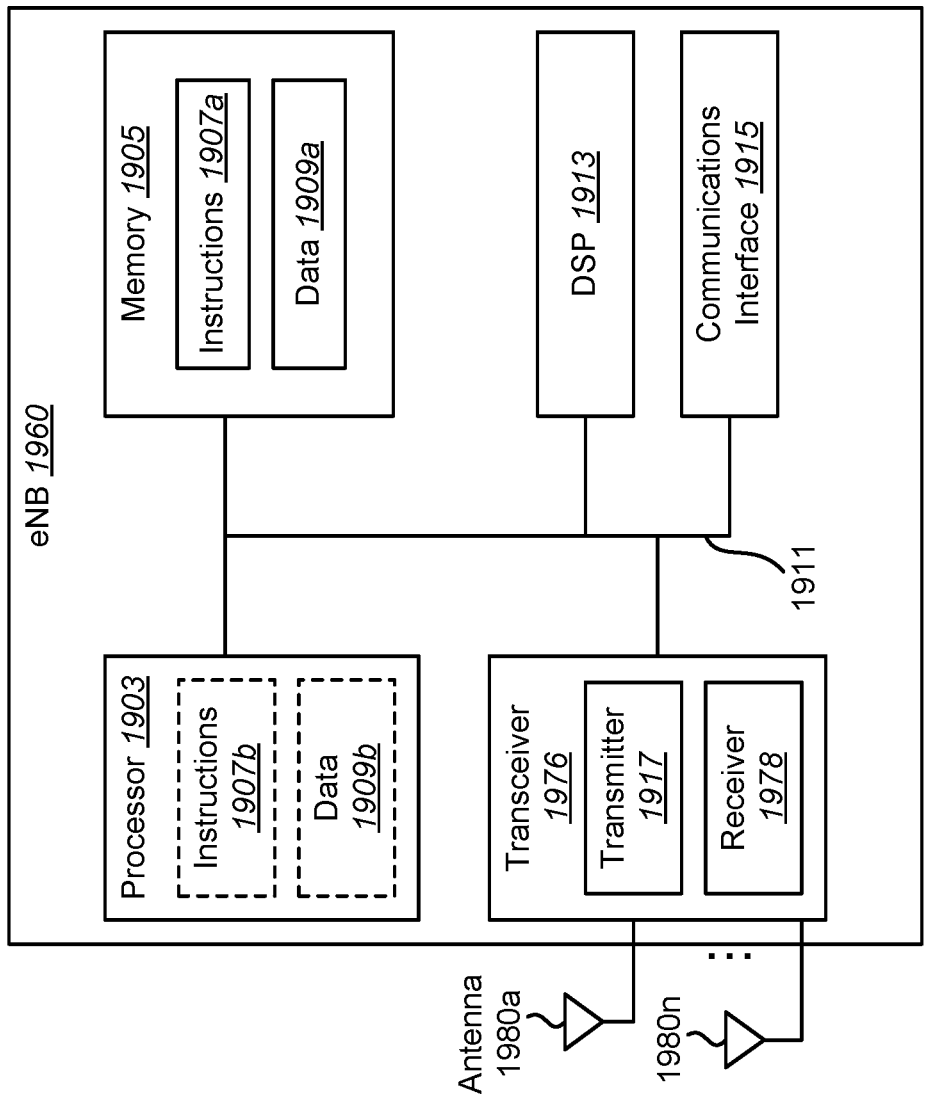
FIG. 19 illustrates various components that may be utilized in an eNB.

FIG. 19 illustrates various components that may be utilized in an eNB 1960. The eNB 1960 described in connection with FIG. 19 may be implemented in accordance with the eNB 160 described in connection with FIG. 1. The eNB 1960 includes a processor 1903 that controls operation of the eNB 1960. The processor 1903 may also be referred to as a central processing unit (CPU). Memory 1905, which may include read-only memory (ROM), random access memory (RAM), a combination of the two or any type of device that may store information, provides instructions 1907a and data 1909a to the processor 1903. A portion of the memory 1905 may also include non-volatile random access memory (NVRAM). Instructions 1907b and data 1909b may also reside in the processor 1903. Instructions 1907b and/or data 1909b loaded into the processor 1903 may also include instructions 1907a and/or data 1909a from memory 1905 that were loaded for execution or processing by the processor 1903. The instructions 1907b may be executed by the processor 1903 to implement the method 400 described above.

The eNB 1960 may also include a housing that contains one or more transmitters 1917 and one or more receivers 1978 to allow transmission and reception of data. The transmitter(s) 1917 and receiver(s) 1978 may be combined into one or more transceivers 1976. One or more antennas 1980a-n are attached to the housing and electrically coupled to the transceiver 1976.

The various components of the eNB 1960 are coupled together by a bus system 1911, which may include a power bus, a control signal bus and a status signal bus, in addition to a data bus. However, for the sake of clarity, the various buses are illustrated in FIG. 19 as the bus system 1911. The eNB 1960 may also include a digital signal processor (DSP) 1913 for use in processing signals. The eNB 1960 may also include a communications interface 1915 that provides user access to the functions of the eNB 1960. The eNB 1960 illustrated in FIG. 19 is a functional block diagram rather than a listing of specific components.

Figure 20:
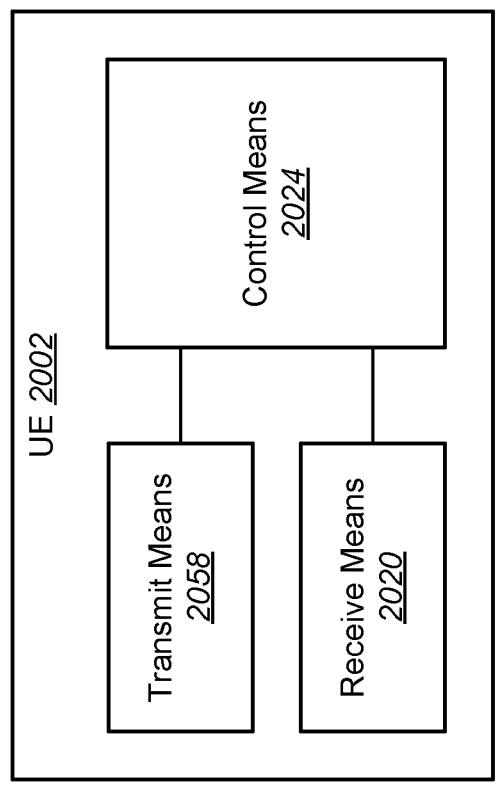
FIG. 20 is a block diagram illustrating one implementation of a UE in which systems and methods for low latency radio communications may be implemented.

FIG. 20 is a block diagram illustrating one implementation of a UE 2002 in which systems and methods for low latency radio communications may be implemented. The UE 2002 includes transmit means 2058, receive means 2020 and control means 2024. The transmit means 2058, receive means 2020 and control means 2024 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

Figure 21:
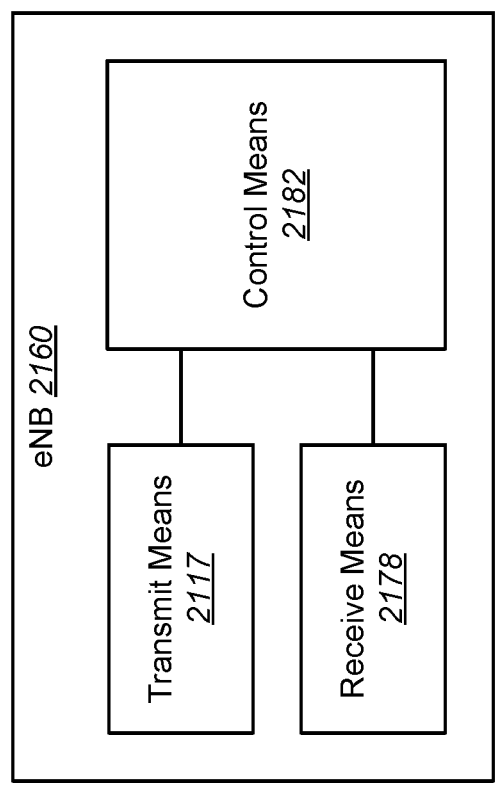
FIG. 21 is a block diagram illustrating one implementation of an eNB in which systems and methods for low latency radio communications may be implemented.

FIG. 21 is a block diagram illustrating one implementation of an eNB 2160 in which systems and methods for low latency radio communications may be implemented. The eNB 2160 includes transmit means 2117, receive means 2178 and control means 2182. The transmit means 2117, receive means 2178 and control means 2182 may be configured to perform one or more of the functions described in connection with FIG. 1 above. FIG. 19 above illustrates one example of a concrete apparatus structure of FIG. 21. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A terminal apparatus comprising:
   a higher-layer processor configured to configure a short transmission timing interval (sTTI) for a first serving cell;
   a physical uplink channel transmitter configured to transmit a physical uplink control channel (PUCCH) on the first serving cell; and
   a short physical uplink channel transmitter configured to transmit a short physical uplink control channel (SPUCCH) on the first serving cell; wherein
   in a case of a collision between the PUCCH and the SPUCCH in a subframe, the PUCCH is dropped.

2. A base station apparatus comprising:
   a higher-layer processor configured to send information indicating a short transmission timing interval (sTTI) for a first serving cell;
   a physical uplink channel receiver configured to receive a physical uplink control channel (PUCCH) on the first serving cell; and
   a short physical uplink channel receiver configured to receive a short physical uplink control channel (SPUCCH) on the first serving cell; wherein
   in a case of a collision between the PUCCH and the SPUCCH in a subframe, the base station apparatus assumes that the PUCCH is dropped.

3. A method for a terminal apparatus, the method comprising:
   configuring a short transmission timing interval (sTTI) for a first serving cell;

transmitting a physical uplink control channel (PUCCH) on the first serving cell; and transmitting a short physical uplink control channel (SPUCCH) on the first serving cell; wherein in a case of a collision between the PUCCH and the SPUCCH in a subframe, the PUCCH is dropped.

4. A method for a base station apparatus, the method comprising:

sending information indicating a short transmission timing interval (sTTI) for a first serving cell;

receiving a physical uplink control channel (PUCCH) on the first serving cell; and receiving a short physical uplink control channel (SPUCCH) on the first serving cell; wherein in a case of a collision between the PUCCH and the SPUCCH in a subframe, the base station apparatus assumes that the PUCCH is dropped.

* * * * *